United States Patent
Palmer et al.

(10) Patent No.: US 6,195,683 B1
(45) Date of Patent: *Feb. 27, 2001

(54) VIDEO TELECONFERENCING FOR NETWORKED WORKSTATIONS

(75) Inventors: Ricky S. Palmer; Larry G. Palmer, both of Nashua, NH (US)

(73) Assignee: Compaq Computer Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 08/799,782

(22) Filed: Feb. 12, 1997

Related U.S. Application Data

(63) Continuation of application No. 08/599,841, filed on Feb. 12, 1996, now Pat. No. 5,608,653, which is a continuation of application No. 08/343,657, filed on Nov. 22, 1994, now Pat. No. 5,546,324, which is a continuation of application No. 07/893,074, filed on Jun. 3, 1992, now Pat. No. 5,375,068.

(51) Int. Cl.$^7$ .................................................. G06F 15/16
(52) U.S. Cl. ........................ 709/204; 709/218; 709/219; 709/223
(58) Field of Search ........................ 395/200.34, 300.38, 395/200.41, 200.57, 200.61, 200.68; 345/330, 327; 709/204, 218, 219, 223, 227

(56) References Cited

U.S. PATENT DOCUMENTS

| | | | |
|---|---|---|---|
| 3,584,142 | 6/1971 | Schoeffler | 178/6.8 |
| 4,387,271 | 6/1983 | Artom | 179/2 DP |
| 4,516,156 | 5/1985 | Fabris et al. | 358/85 |
| 4,525,779 | 6/1985 | Davids et al. | 364/200 |
| 4,574,374 | 3/1986 | Scordo | 370/62 |
| 4,587,651 | 5/1986 | Nelson et al. | 370/88 |
| 4,645,872 | 2/1987 | Pressman et al. | 379/54 |
| 4,650,929 | 3/1987 | Boerger et al. | 358/86 |

(List continued on next page.)

OTHER PUBLICATIONS

Palmer and Palmer, "Desktop Meeting", LAN Magizine, 6(11):111–121 (Nov. 1991).

D. Comer, "Internetworking with TCP/IP, vol. I: Principles, Protocols, and Architecture", 2nd Edition, pp. 1–8, 337–346, 505 (Prentice Hall: Englewood Cliffs, New Jersey 1991).

(List continued on next page.)

Primary Examiner—Thomas R. Peeso
(74) Attorney, Agent, or Firm—Hamilton, Brook, Smith & Reynolds, P.C.

(57) ABSTRACT

A video teleconferencing method and apparatus for computer workstations connected by a digital data network includes a transmission source means for a local workstation to send audio and video teleconference data across the network to one or more remote workstations, and, a receiver for the local workstation to receive audio and video teleconference data back from the remote workstations. The local workstation sends teleconference data to each of the remote workstations over a variable bandwidth digital data connection, and each of the remote workstations returns teleconference data back to the local workstation over another variable bandwidth digital data connection. The transmission source means includes a master software process executing on the local workstation, and the receiver includes a slave software process executing the remote workstation. The master process of a local workstation causes execution of a slave process on a remote workstation for receiving video teleconference data from the local workstation. An audio data transmitter for sends an audio data stream to the remote workstation such that the audio data can be reconstructed into a continuous audio signal. A video transmitter sends video data so that each frame of video data to be sent is inserted into the audio data stream without affecting the continuity of the reconstructed audio signal at the remote workstation.

15 Claims, 28 Drawing Sheets

U.S. PATENT DOCUMENTS

| | | | |
|---|---|---|---|
| 4,653,090 | 3/1987 | Hayden | 379/204 |
| 4,679,191 | 7/1987 | Nelson et al. | 370/84 |
| 4,686,698 | 8/1987 | Tompkins et al. | 379/53 |
| 4,710,917 | 12/1987 | Tompkins et al. | 370/62 |
| 4,734,765 | 3/1988 | Okada et al. | 358/102 |
| 4,748,618 | 5/1988 | Brown et al. | 370/94 |
| 4,827,339 | 5/1989 | Wada et al. | 358/136 |
| 4,847,829 | 7/1989 | Tompkins et al. | 370/62 |
| 4,849,811 | 7/1989 | Kleinerman | 358/133 |
| 4,882,743 | 11/1989 | Mahmoud | 379/53 |
| 4,888,795 | 12/1989 | Ando et al. | 379/53 |
| 4,893,326 | 1/1990 | Duran et al. | 379/53 |
| 4,897,866 | 1/1990 | Majmudar et al. | 379/94 |
| 4,905,231 | 2/1990 | Leung et al. | 370/94.1 |
| 4,918,718 | 4/1990 | Emmons et al. | 379/53 |
| 4,924,311 | 5/1990 | Ohki et al. | 358/138 |
| 4,932,047 | 6/1990 | Emmons et al. | 379/53 |
| 4,935,953 | 6/1990 | Appel et al. | 379/53 |
| 4,942,540 | 7/1990 | Black et al. | 364/514 |
| 4,943,994 | 7/1990 | Ohtsuka et al. | 379/53 |
| 4,949,169 | 8/1990 | Lumelsky et al. | 358/86 |
| 4,953,159 | 8/1990 | Hayden et al. | 370/62 |
| 4,953,196 | 8/1990 | Ishikawa et al. | 379/53 |
| 4,962,521 | 10/1990 | Komatsu et al. | 379/53 |
| 4,965,819 | 10/1990 | Kannes | 379/53 |
| 4,995,071 | 2/1991 | Weber et al. | 379/53 |
| 5,003,532 | 3/1991 | Ashida et al. | 370/62 |
| 5,034,916 | 7/1991 | Ordish | 364/900 |
| 5,042,006 | 8/1991 | Flohrer | 364/900 |
| 5,042,062 | 8/1991 | Lee et al. | 379/54 |
| 5,046,079 | 9/1991 | Hashimoto | 379/53 |
| 5,046,080 | 9/1991 | Lee et al. | 379/73 |
| 5,056,136 | 10/1991 | Smith | 389/10 |
| 5,062,136 | 10/1991 | Gattis et al. | 380/18 |
| 5,072,442 | 12/1991 | Todd | 370/62 |
| 5,079,627 | 1/1992 | Filo | 358/85 |
| 5,099,510 | 3/1992 | Blinken, Jr. et al. | 379/202 |
| 5,103,444 | 4/1992 | Leung et al. | 370/60 |
| 5,111,409 | 5/1992 | Gasper et al. | 395/152 |
| 5,113,431 | 5/1992 | Horn | 379/94 |
| 5,195,086 | 3/1993 | Baumgartner et al. | 379/202 |
| 5,200,989 | 4/1993 | Milone | 379/96 |
| 5,283,561 | 2/1994 | Lumelsky et al. | 340/271 |
| 5,375,068 | 12/1994 | Palmer et al. | 364/514 |
| 5,432,525 | 7/1995 | Maruo et al. | 345/2 |

OTHER PUBLICATIONS

S.E. Minzer, "New Directions in Signaling for Broadband ISDN," IEEE Communications Magazine, pp. 6–14 (Feb. 1989).

L.F. Ludwig, "Integration of CAD/CAE with Multimedia Teleconferencing and Messaging Via Broadband Networks and Shared Resource Servers, " Systems Integration '90, Proceeding of the First International Conference on Systems Integration, pp. 136–143 (1990).

Liebhold, M., et al., "Digital Multimedia Systems," Communications of the ACM, 34 (4) :104–112 (Apr., 1991).

Rangan, P.V., et al., "Software Architecture for integration of Video Services in the Etherphone System," IEEE Journal on Selected Areas in Communications, vol. 9(9) :1395–1404 (Dec. 1991).

Jeffay, K, et al., "Kernal Support for Live Digital Audio and Video," University of North Carolina at Chapel Hill, Department of Computer Science, Chapel Hill, NC USA 27599–3175, pp. 11–21 (Jul., Aug. 1992).

Wolfiner, B., et al., "A Continuous Media Data Transport Service and Protocol for Real–Time Communication in High Speed Networks," The Tenet Group, Computer Science Division, Dept. of EECS, University of California, Berkeley and International Computer Science Institute, Berkeley, CA 94720, USA, pp. 172–182 (Nov. 1991).

Sabri, S., et al., "Video Conferencing System," Proceedings of the IEEE, vol. 73 (4) :671–688 (Apr. 1985).

Weiss, C., "Desk Top Video Conferencing — An Important Feature of Future Visual Communications, " IEEE, CH2829, pp. 0134–0139 (1990).

Aguilar, L., et al., "Architecture for a Multimedia Teleconferencing System," Information Sciences and Technology Center, SRI International, Menlo Park, CA 94025, pp. 126–136 (1986).

Anderson, D., et al., "Support for Continuous Media in the Dash System, " Computer Science Division, Department of Electrical Engineering and Computer Science, University of California, Berkeley, Berkeley, CA 94720, pp. 54–61 (1990).

Anderson, D, et al., "First International Workshop on Network and Operating System Support for digital Audio and Video," TR–90–062, International Computer Science Institute (ICSI), Berkeley, CA (Nov. 8–9, 1990).

Leydekkers, P., et al., "Synchronization of Multimedia Data Streams in Open Distributed Environments," Network and Operating System Support for Digital Audio and Video, Second International Workshop, Heidelberg, Germany, pp. 94–107 (Nov. 1991).

Frey, S., et al., "An Application Framework for Multimedia Communication," Network and Operating System Support for Digital Audio and Video, Second International Workshop, Heidelberg, Germany, pp. 255–264 (Nov. 1991).

Anderson, D., et al., "Toolkit Support for Multiuser Audio/ Video Applications," Network and Operating System Support for Digital Audio and Video, Second International Workshop, Heidelberg, Germany, pp. 231–241 (Oct. 25, 1991).

Blakowski, G., et al., "Tools for Specifying and Executing Synchronized Multimedia Presentations,"Network and Operating System Support for Digital Audio and Video, Second International Workshop, Heidelberg, Germany, pp. 272–282 (Nov. 1991).

Meissner, K., "Architectural Aspects of Multimedia CD–1 Integration in UNIX / X–Windows Workstations," Network and Operation System Support for Digital Audio and Video, Second International Workshop, Heidelberg, Germany, pp. 314–327 (Nov. 1991).

Jeffay, et al., "System Design for Workstation–Based Conferencing with Digital Audio and Video," IEEE CH2955, pp. 169–177 (Mar. 1991).

A calls B, B answers

A calls C, C answers

B calls C or A joins B and C

START
Total length = 2 bytes
FIG. 8
OK
Total length = 2 bytes
FIG. 9
STARTHEADER
5 reserved longwords (32 bits each)
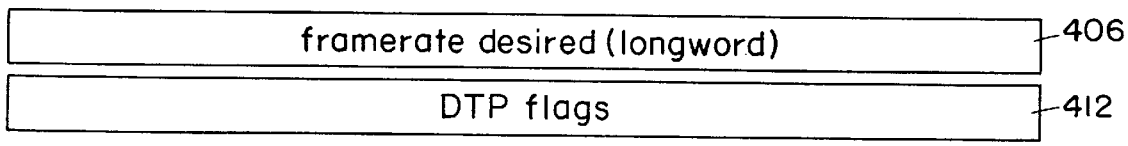
2 reserved longwords
| total number of frames | 408 |
1 reserved longword
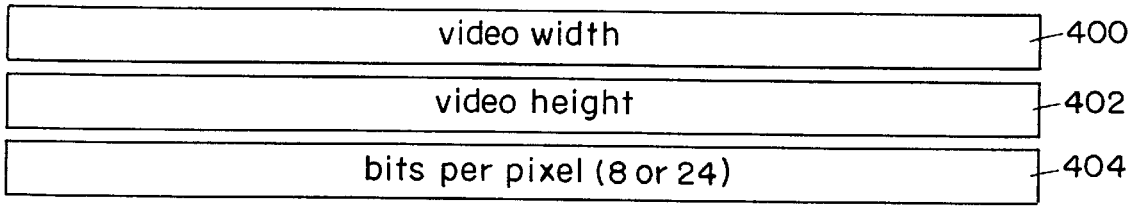
35 reserved longwords
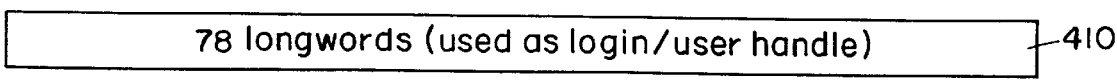
FIG. 10

QUIT

| 01010100 = 0x54 | 01010001 = 0x51 |

Total length = 2 bytes

FIG. 11

ANSWERMACHINE

| 01001101 = 0x4D | 01000001 = 0x41 |

Total length = 2 bytes

FIG. 12

CONTROL

| 0x54 | 0x43 | ⌐450

| which | ⌐452
| length | ⌐454
| flags | ⌐456

5 reserved longwords

Total length is 34 bytes

FIG. 13

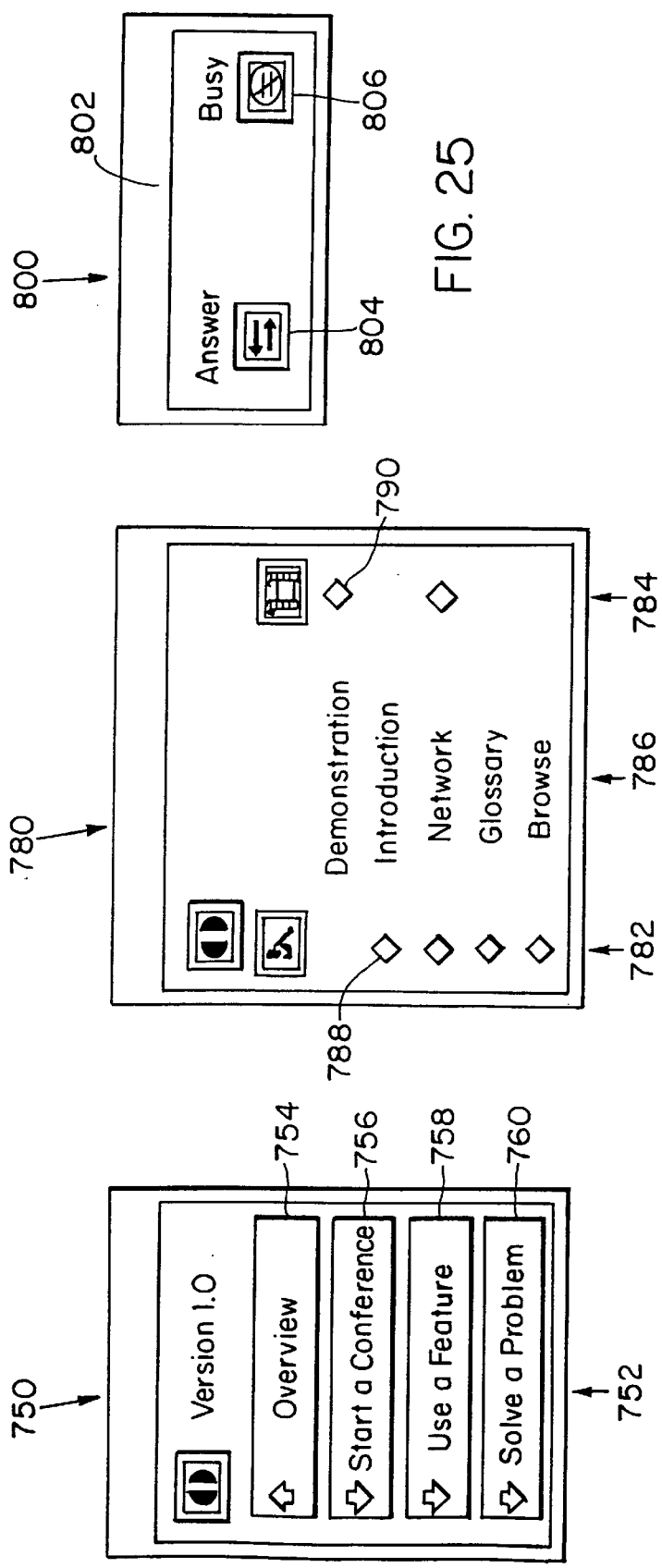

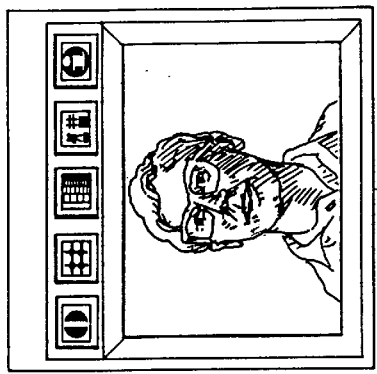
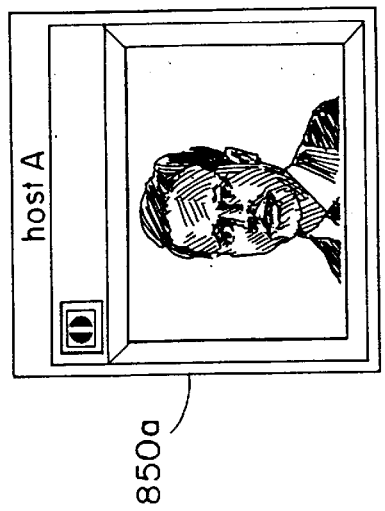
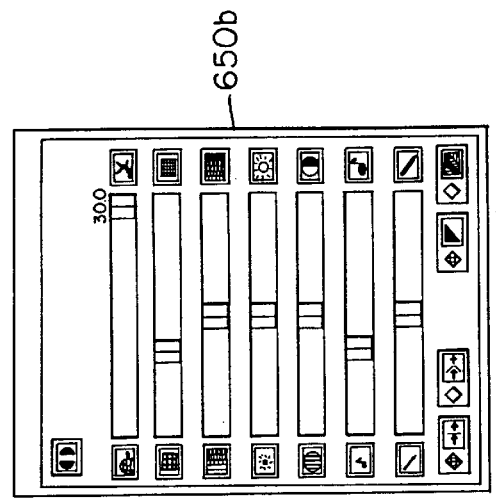
FIG. 26(c)

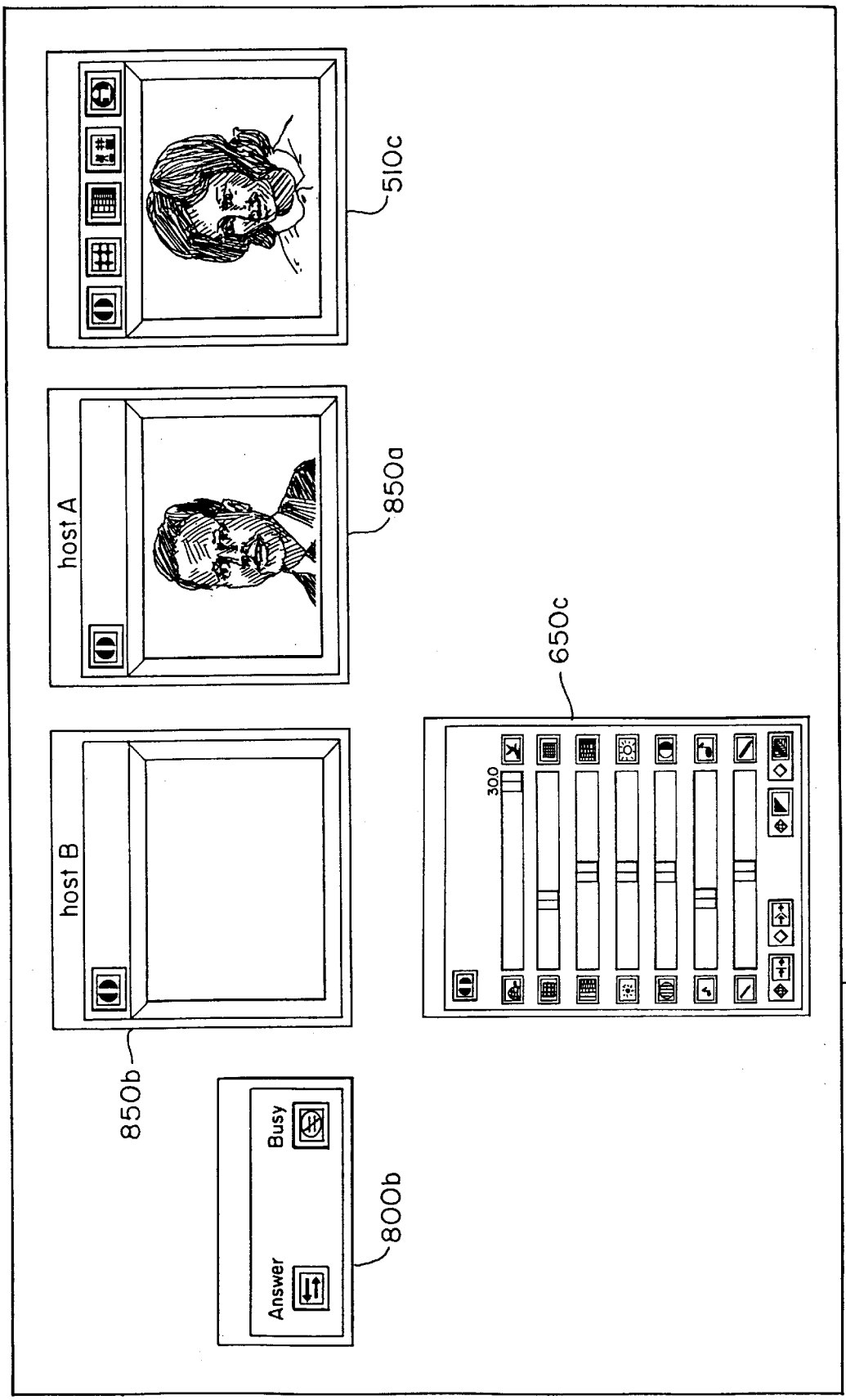

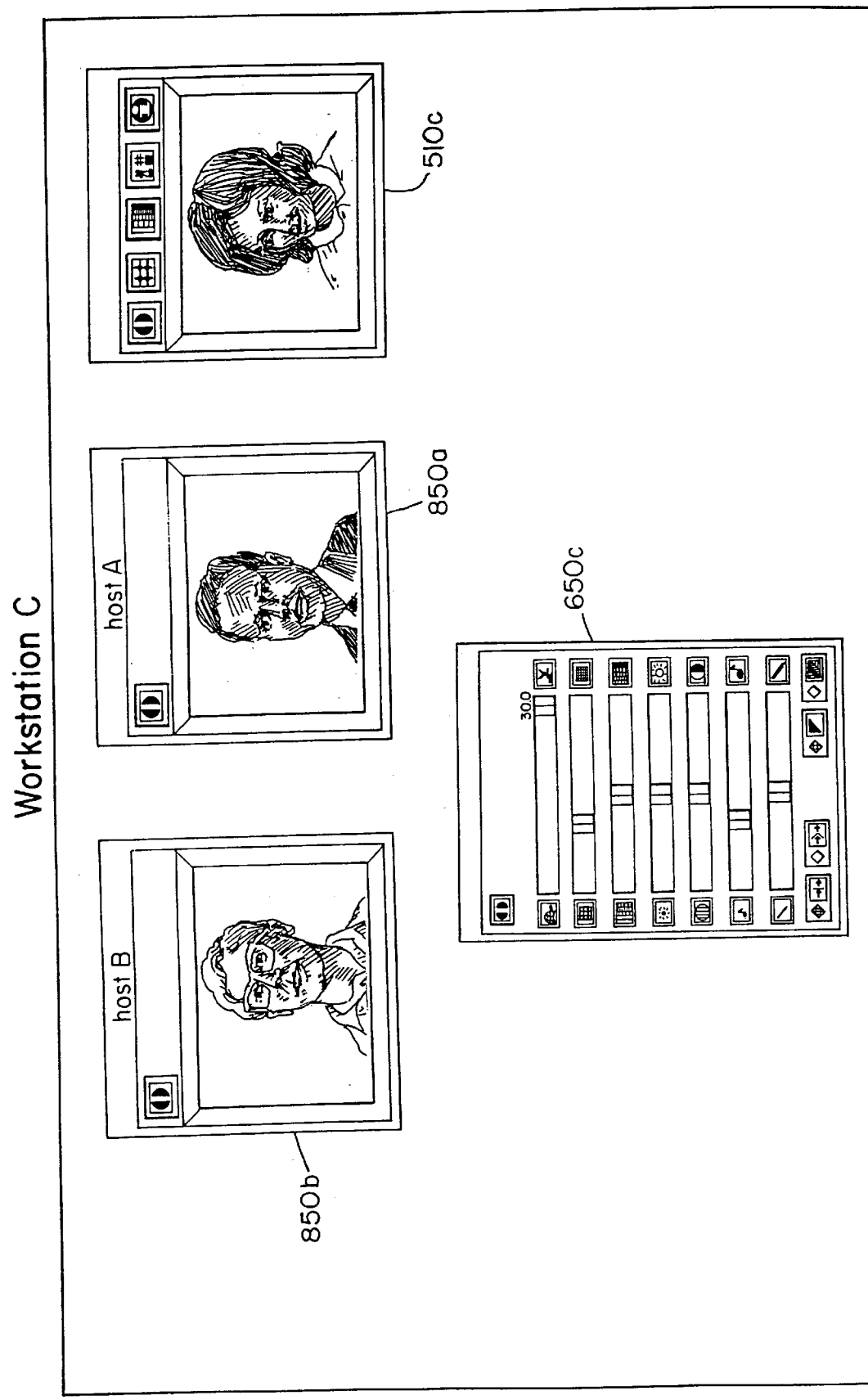

VIDEO TELECONFERENCING FOR NETWORKED WORKSTATIONS

This application is a continuation of application Ser. No. 08/599,841, filed Feb. 12, 1996, now U.S. Pat. No. 5,608,653, which is a continuation of U.S. Ser. No. 08/343,657, filed Nov. 22, 1994, now U.S. Pat. No. 5,546,324, which is a continuation of Ser. No. 07/893,074, filed Jun. 3, 1992, now U.S. Pat. No. 5,375,068.

BACKGROUND OF THE INVENTION

Video communications has evolved over the years from a simple video telephone concept to a sophisticated network for allowing multiple users to participate in a video teleconference. For full featured video teleconferencing, users require both an audio communications path and a real time visual communication path synchronized to the audio path. Furthermore, it is desirable to support full color video and telephone quality audio. Video teleconferencing capabilities are limited mainly by the bandwidth of the transmission medium connecting the teleconferencing terminals.

Many computer workstations used in the office or laboratory environment today are connected with other workstations, file servers, or other resources over high-speed local area networks. Local area networks, in turn, are often connected together through high-speed gateways which connect workstations which may be distributed over a wide geographic area. Network wide protocols allow workstations to exchange packets of data at high rates of speed and reliability. Fixed bandwidth digital and analog video channels have been combined with computer networks to implement some video teleconferencing features. These include high bandwidth CATV/FDM type analog channels and fixed allocation TDM data channels for the video data.

SUMMARY OF THE INVENTION

Workstations today have obtained unprecedented computational power and utility. The powerful RISC type CPUs and fast, high resolution graphical displays have made possible multimedia workstations which integrate live audio and video into the programming environment. Graphical User Interface operating systems (GUI) have allowed effective integration of audio and video into application programming.

The present invention provides n-way video teleconferencing among networked computer workstations using the existing variable bandwidth digital data network for transferring synchronized audio and video teleconferencing data between the workstations. The teleconferencing apparatus and protocol of this invention provides high quality video teleconferencing without the need for a guaranteed wide bandwidth analog video channel or a fixed allocation digital video channel. Rather, the invention uses standard non-allocated data packets typically found on local area networks to transfer the audio and video teleconferencing data. Thus, no guaranteed bandwidth is required to carry on a useful video teleconference. An continuous audio data stream model provides continuous audio signals at the expense of video data when necessary, which is desirable since the ear is more sensitive to a break in the audio data than the eye is to the loss of a frame of video data. A "push" data model provides a secure system by preventing remote workstations from activating another workstation's video teleconferencing functions.

In general, in one aspect, the invention features a video teleconferencing method and apparatus for computer workstations connected by a digital data network. The computer workstations include a transmission source means for a local workstation to send audio and video teleconference data across the network to one or more remote workstations, and, a receiver for the local workstation to receive audio and video teleconference data back from the remote workstations. The local workstation sends teleconference data to each of the remote workstations over a variable bandwidth digital data connection, and each of the remote workstations returns teleconference data back to the local workstation over another variable bandwidth digital data connection. The variable bandwidth digital data connections include the data packet oriented data channels associated with, for example, FDDI, DECnet, and Ethernet local area networks. Furthermore, a wide area digital network, such as ISDN, can also be used with the video teleconferencing apparatus and method of this invention.

In preferred embodiments, the transmission source means includes a master software process executing on the local workstation, and the receiver includes a slave software process executing the remote workstation. The master software process formats and sends video teleconference data to the slave process. The slave process receives and reconstructs the audio and video teleconference data for audible and visual reproduction, respectively. The video data is presented as an image on the display of the receiving workstation, while the audio data is sent to either amplified speakers or headphones.

In other preferred embodiments, the master process of a local workstation causes execution of a slave process on a remote workstation for receiving video teleconference data from the local workstation. The slave process running on the remote workstation in turn causes execution of a master process on the remote workstation for sending video teleconference data back to the local workstation. The master process of the remote workstation in turn causes execution of a slave process on the local workstation for receiving the video teleconference data sent by the master process of the remote workstation. The local workstation executes a slave process for each master process on a remote workstation sending video teleconference data to the local workstation.

In yet other preferred embodiments, the transmission source includes an audio data transmitter for sending an audio data stream to the remote workstation such that the audio data can be reconstructed into a continuous audio signal. The transmission source also includes a video transmitter for sending video data to the remote workstation so that each frame of video data to be sent is inserted into the audio data stream without affecting the continuity of the reconstructed audio signal at the remote workstation.

In yet other preferred embodiments the video transmitter precludes a frame of video data from being sent to the remote workstation if a system overload exists. The audio transmitter sends the audio data stream corresponding to the precluded video frame to the remote workstation to prevent loss of continuity of the audio signal during a system overload. In other preferred embodiments the video transmitter precludes a frame of video data from being sent to the remote workstation in response to a system failure condition. The audio transmitter accumulates audio data for a predetermined time interval during the system failure condition, and transmits the accumulated audio data stream to the remote workstation once the failure has been corrected. For instance, the audio transmitter may continually accumulate the last ½ second of audio data while the failure exists, trimming any audio data older than ½ second. The last ½ second of audio data accumulated before the failure is corrected is sent to the remote workstation as soon as the failure is corrected. The most recently available frame of video is then also sent.

In still other preferred embodiments, timing information is attached to each frame of video data sent to the remote workstation. The timing information indicates a point in the continuous audio data stream which corresponds in time to the frame of video data. The receiver of the remote workstation includes a synchronizer for displaying a received frame of video when the point in the audio stream corresponding to the timing information of the received video frame is audibly reproduced at the remote workstation. The synchronizer counts the amount of audio data received in the continuous audio stream and compares the count to the timing information sent along with the most recently received video frame to determine when to display the frame.

In general, in another aspect, the invention features a multimedia computer workstation, such as a RISC workstation or IBM PC, having video teleconferencing capabilities. The multimedia workstation of this invention includes a network interface for establishing a variable bandwidth digital communications channel across a digital data network with another multimedia workstation. A video source provides a frame of digitized video data, and an audio source provides digitized audio data associated with the frame of video data. A data transmitter transmits the audio and video data through the network interface across the variable bandwidth digital communications channel to another workstation. A receiver receives audio and video data through the network interface across the variable bandwidth digital communications channel from another workstation. The workstation also includes means for displaying the received video data on the workstation display, and means for audibly reproducing the received audio data.

In preferred embodiments, the video source includes a video camera, a video tape recorder, and/or a video laser disk player providing frames of analog video. A video frame grabber captures, digitizes, and stores each frame of analog video. The video source also includes digital video data stored in a file accessible by the workstation. A video compressor may compress the video data using JPEG or MPEG compression. The audio source includes a microphone for live audio, or pre-recorded audio corresponding to frames of pre-recorded video, from for instance a video tape recorder or laser disk. An audio digitizer digitizes and stores the audio using mu-law compression. The audio source also includes digital audio data stored in a file, preferably along with digital video data, accessible by the workstation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 illustrates the format of the START message of the teleconferencing protocol of this invention.

FIG. 9 illustrates the format of the OK message of the teleconferencing protocol of this invention.

FIG. 10 illustrates the format of the STARTHEADER message of the video teleconferencing protocol of this invention.

FIG. 11 illustrates the format of the QUIT message of the teleconferencing protocol of this invention.

FIG. 12 illustrates the format of the ANSWERMACHINE message of the teleconferencing protocol of this invention.

FIG. 13 illustrates the format of the CONTROL message of the video teleconferencing protocol of this invention.

FIG. 23 shows a second level documentation graphical user interface window for obtaining information about the operation and features of a video teleconference of this invention.

FIG. 24 shows a third level documentation graphical user interface window for obtaining information about a topic selected from the second level user interface window of FIG. 23.

FIG. 25 shows a graphical user interface window of a ring box for announcing a video teleconference call to another workstation to establish a video teleconference of this invention.

FIGS. 26(a)–26(k) show the dismay screens of three Workstations participating in a three-way video teleconference of this invention.

DESCRIPTION OF THE PREFERRED EMBODIMENT

Figure 1:
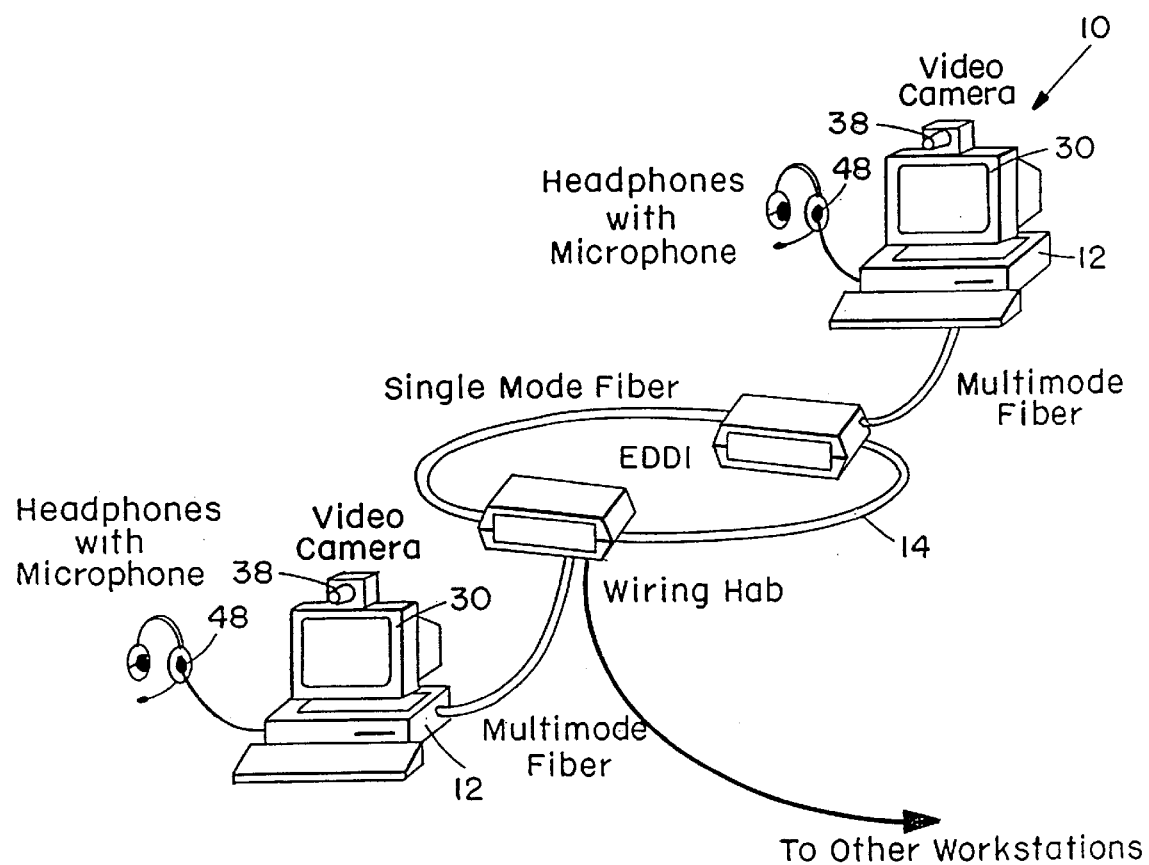
FIG. 1 is a pictorial representation of the distributed computer system featuring multimedia workstations having video teleconferencing capabilities of this invention.

FIG. 1 shows a distributed computer system 10, having a plurality of multimedia workstations 12 connected by a high speed digital network 14, which features n-way video teleconferencing of this invention. Each of the multimedia workstations 12 is capable of producing live audio and video data for transmission across the network to another multimedia workstation. Further, each of the multimedia workstations is capable of sonically reproducing the audio data and visually reproducing the video data received from another workstation.

Two or more of the networked workstations can participate in an n-way video teleconference using the teleconferencing protocol of this invention. The teleconferencing protocol of this invention allows real time synchronized audio and video transmission across the network without the use of a fixed bandwidth or dedicated time slot transmission medium. Rather, this invention provides high performance video teleconferencing features using standard digital network transport level protocols such as Internet TCP/IP and UDP/IP, or DECnet™. The physical network link 14 should be a high speed FDDI (Fiber Distributed Data Interface) fiber optic link running at 100 MB/Sec. for maximum performance (about 15 uncompressed black and white frames per second), but can also be virtually any type of high quality digital network link such as an Ethernet™. In the case of the FDDI network link, performance is typically limited by the workstation hardware and software, rather than by the throughput of the network. In addition, wide area networking (WAN) technologies, such as T1 and T3 digital carriers, can be used with the video teleconferencing protocol of this invention. These WAN technologies can be expected to achieve a video frame rate of at least about 12 Hz, assuming black and white video images compressed with JPEG, MPEG, or another video compression technique. The features of one preferred embodiment of this invention are commercially embodied in the DECspin™ product available from Digital Equipment Corporation, Maynard, Massachusetts, the assignee of this patent application.

Figure 2:
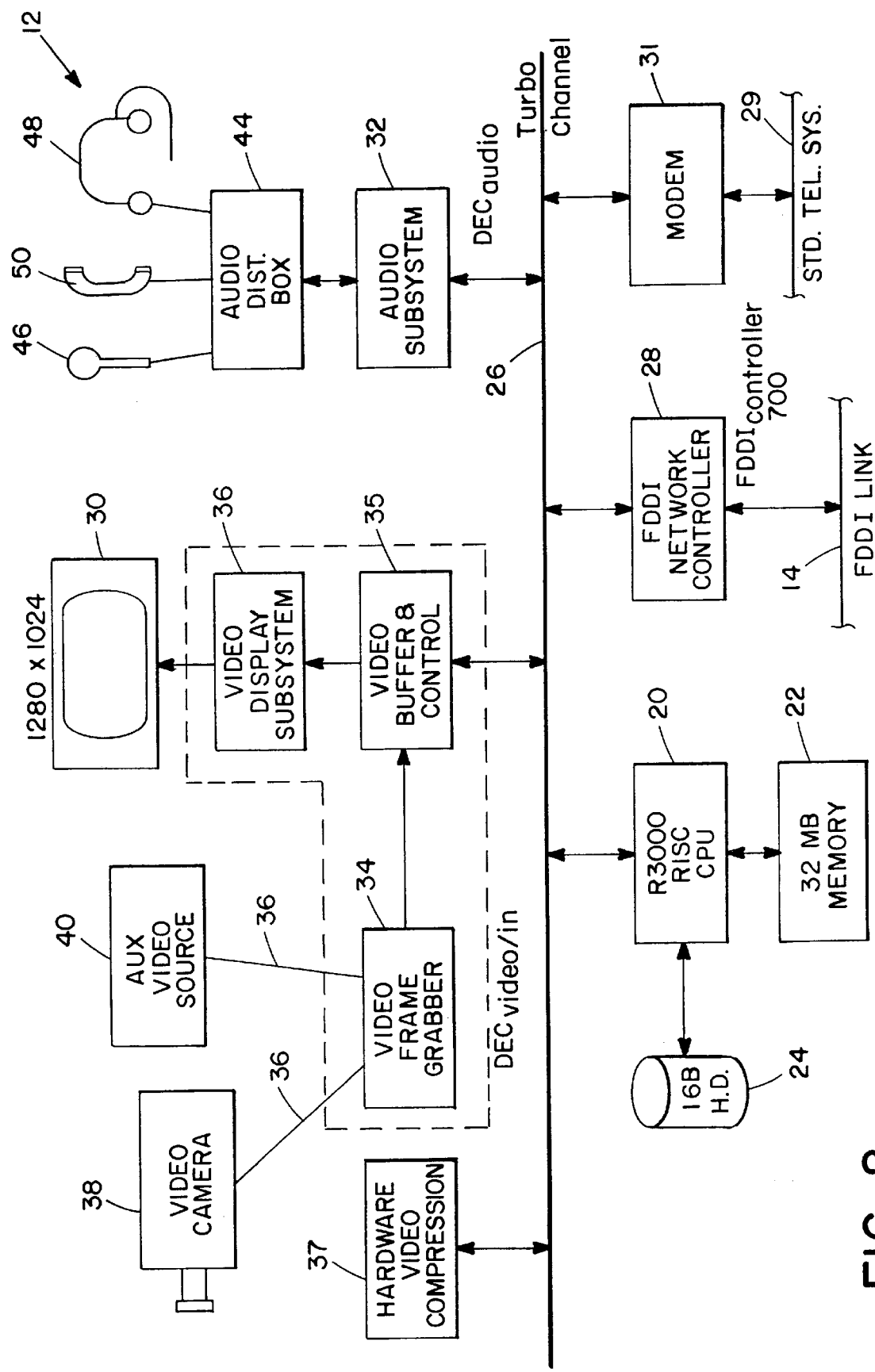
FIG. 2 is a block diagram showing a preferred embodiment of the multimedia workstation for implementing the video teleconferencing features of the distributor computer system of FIG. 1.

FIG. 2 shows a preferred embodiment of the multimedia workstation 12 for implementing the video teleconferencing protocol of this invention. Workstation 12 includes a high performance processor 20 connected to a large working memory 22 having 24 megabytes or more capacity, and a large hard drive having 1 gigabytes or more capacity. A high performance backplane channel 26 connects the processor, memory, and hard disk to other devices in the workstation.

The workstation is coupled to the digital network communications link 14 through a network controller 28 connected between the network link 14 and the backplane channel 26. The workstation is also coupled to a voice grade telephone line 29 through a modem 31 connected between the backplane channel and the telephone line. Similarly, the workstation can be connected to other digital data conversation services, such as the ISDN digital telephone network.

Multimedia workstation 12 includes a color video frame grabber 34 for capturing and digitizing frames of video from one or more analog video inputs 36. Video inputs 36 are each connected to a video source, such as a video camera 38 providing live analog video signals, or an auxiliary video storage device 40, such as a VCR or video laser disk player providing stored analog video signals. The analog video signals may be of any standard types such as NTSC, SECAM, or PAL.

The multimedia workstation 12 also includes a video buffer 35 which stores a frame of full color video graphics and characters generated by the workstation for display on a 1280×1024 pixel color monitor 30. The video buffer 35 (and associated buffer controller) is connected to the backplane channel 26 for receiving video data from the processor 20. The video buffer is also connected to a video display subsystem 36 which converts the stored video frame data into analog signals for driving the color monitor 30.

The video frame grabber 34 stores its digitized video data directly into a predetermined area of the video buffer 35. Thus, the digitized video input to the workstation by the frame grabber appears directly in a predetermined area on the monitor 30, without having to pass through processor 20 or main memory 22. Further, processor 20 can read back the captured video frame data from the video buffer, store the data in main memory 22, and further process the video data according to the video teleconferencing protocol described herein.

Frame grabber 34 digitizes and stores each frame of video from an analog video source and can deliver up to 30 frames per second of digitized 640×480 true color (24 bits) of NTSC/SECAM/PAL video into video frame buffer 35. A dedicated hardware video compression subsystem 37 can also be connected to the backplane channel 26 to provide high performance video compression of the digitized video data.

The audio features of the multimedia workstation 12 are implemented using an audio controller 42 connected to the backplane channel 26 for interfacing audio signals into the workstation and reproducing audio signals out of the workstation. An audio distribution box 44 is connected to the audio controller for directing audio to and from audio devices such as a microphone 46, a headphone 48, and/or a telephone receiver 50. Auxiliary audio devices such as a recording device, a CD player, or amplified speakers may also be connected to the distribution box 44. Audio controller 42 receives audio input from the distribution box and digitizes the audio using an 8 bit mu-law encoder at 64 kbits per second or less to match typical telephone voice grade audio standards (8 kHz bandwidth). For convenience, the headphones 48 and microphone 46 may be combined into a single headset.

In one commercial embodiment available from Digital Equipment Corporation, multimedia workstation 12 is built around a DECstation™ 5000/200 workstation in which processor 20 is an R3000™ RISC processor and backplane channel 26 is a TurboChannel™ (TC) bus. Network controller 28 is a DEC FDDIcontroller 700™. Frame grabber 34/video buffer 35/video display subsystem 36 is a DECvideo/in™ TurboChannel compatible video system, and audio controller 42 is a DECaudio™ TurboChannel compatible audio controller.

Alternatively, multimedia workstation 12 can be built around a person computer platform, such as an IBM™ compatible PC. Preferably, the PC should have a high speed Intel 80386™, 80486™, or successor processor. The PC should be compatible of running in the Microsoft Windows™ or Windows NT™ graphical operating system environment.

Workstations and PCs of different performance levels can all participate in the same video teleconference using the video teleconferencing protocol of this invention. For instance, less powerful or slower PC's and workstations can simply communicate at a slower video rate with the more powerful workstations, without affecting the overall video rate between other workstations.

The effective video frame rate of a video teleconference depends to a large extent on the quantity of video data handled by a workstation during each video frame. Video compression techniques can greatly enhance the effective frame rate of the video teleconference especially over lower data transfer rate services such as ISDN. Standard compression methods such as JPEG (Joint Photographic Experts Group), MPEG (Motion Picture Experts Group) and Px64 can be implemented using a dedicated hardware subsystem 37 which have recently become available.

A video compression technique which has been found useful for use with the video teleconferencing protocol of this invention features pixel decimation and replication (PDR). This PDR technique effectively subsamples by ½ a full frame of video pixels in the vertical (Y) and horizontal (X) directions. Thus, a frame of video captured by the frame grabber is reduced to one quarter of its original size. The subsampling is accomplished by a scaling function featured on the frame grabber 34 of FIG. 2.

Reconstruction of the image is implemented in software by replicating every pixel received twice along a line, and then replicating the reconstructed line as the next line of the restored image. The replicated line is shifted by a single pixel to prevent any pixel block patterns from forming. Results have shown acceptable quality of the received image, while offering significantly increased system throughput and performance.

Figure 3:
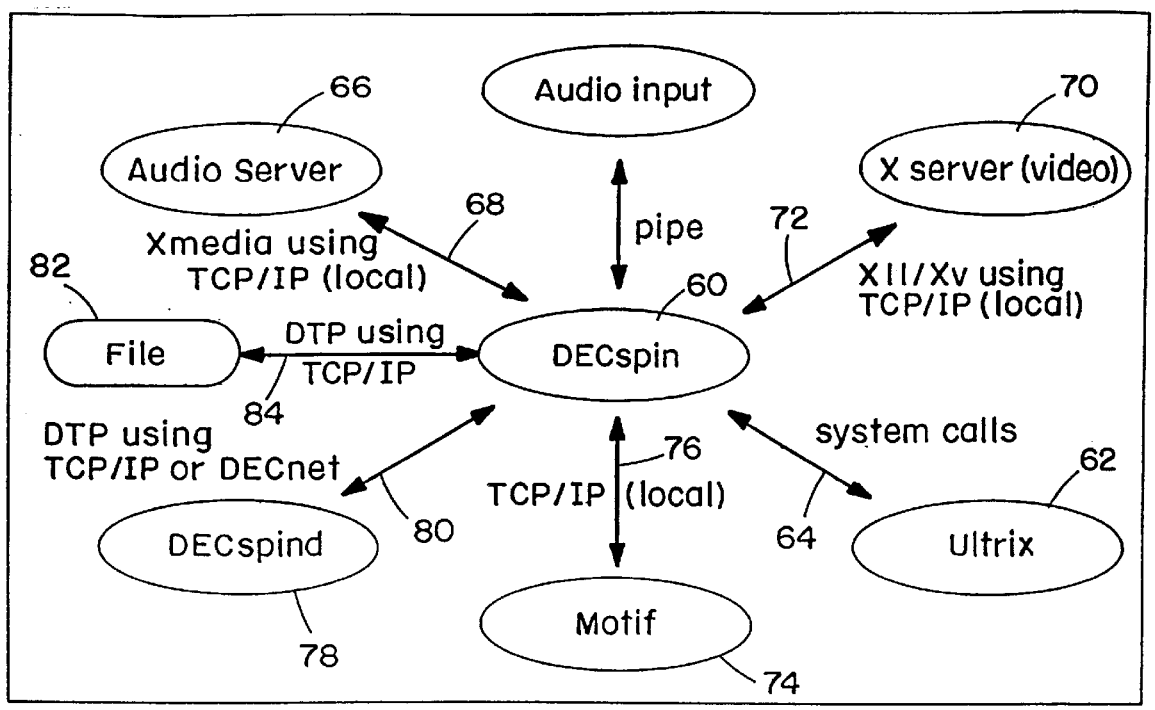
FIG. 3 is a block diagram showing the software environment for implementing a preferred embodiment of a DECspin video teleconferencing application for implementing the video teleconferencing features of the system of FIG. 1.

FIG. 3 shows a diagram of the DECspin™ product software system environment for a preferred embodiment of this invention. Generally, the Digital Teleconferencing Protocol (DTP) is implemented by a DECspin™ application program 60 which resides at the application layer of the standard ISO 7-layer network model. The DTP video teleconferencing protocol of this invention is used to transfer audio and video data between workstations, as well as between local applications (loopback), and for storing and retrieving audio and video data to and from a disk file.

The DECspin application program 60 runs on top of an Ultrix™ (V4.2a or its successors) (UNIX™) 62 operating system. All communications between the DECspin application 60 and the UNIX operating system 62 are handled via UNIX system calls 64. The DECspin application program 60 is written as an X Windows™ application running under a. Motif™ X Windows manager. A description of the Ultrix, X Windows, and X11 programming environments can be found in "ULTRIX Worksystem Software, X Window System Protocol: X Version 11," Digital Equipment Corporation, order number AA-MA98A-TE, Maynard, Mass. (1988, Version 2.0), the contents of which are incorporated herein by reference. A description of the Motif programming environment can be found in Open Software Foundation, "OSF/Motif Programmer's Guide," Prentice Hall, Englewood Cliffs, N.J. 07632 (1991, Revision 1.1), the contents of which are incorporated herein by reference.

Through UNIX system calls the DECspin application establishes local TCP/IP "sockets" for communication with various software servers providing multimedia services for the DECspin application. The creation and use of UNIX "socket" system calls for creating TCP/IP application connections is discussed in detail by Comer, D.E., "Internetworking With TCP/IP, Vol. 1: Principles, Protocols, and Architecture, Second Edition" Prentice Hall, Englewood Cliffs, N.J. (1991) (pp 337–346), the contents of which is incorporated herein by reference. The DECspin application communicates with an audio server application 66 which provides audio services using X Windows Xmedia commands 68 through a local TCP/IP "socket". The DECspin application communicates with a video X Windows Xserver application 70 which provides video services using X11 and XV extension commands 72 through another local TCP/IP "socket". DECspin communicates with-a Motif based graphical user interface (GUI) 74 through yet another local TCP/IP "socket".

The DECspin application communicates with a DECspind "slave" application 78, running on either the local or a remote workstation using the DTP video teleconferencing protocol 80 via another "socket". The DECspind application is a UNIX "deamon" version of the DECspin application which is "slaved" to a DECspin "master" application running on either the local or a remote workstation. The DECspind application is used to receive, reconstruct, synchronize, and display audio and video data sent to it from either a local or remote DECspin application using the DTP protocol. Where the DECspind application is operating on the local workstation, the "socket" is a local TCP/IP "socket". Where the DECspind application is operating on a remote workstation, the "socket" can be either a remote TCP/IP or DECnet "socket".

Furthermore, the DECspin application can store audio and video data to a system file 82 using the DTP video teleconferencing protocol 84 via another "socket". This creates a stored "film clip" audio and video data stream which can be played back using a DECspind application. That is, a DEcspind application creates a "socket" to the stored file, and receives data from through the socket via the same DTP protocol. This is the equivalent of the DECspind application receiving the audio and video data directly from a DECspin application via the DTP video teleconferencing protocol, but without the acknowledgement protocol discussed below.

Figure 4:
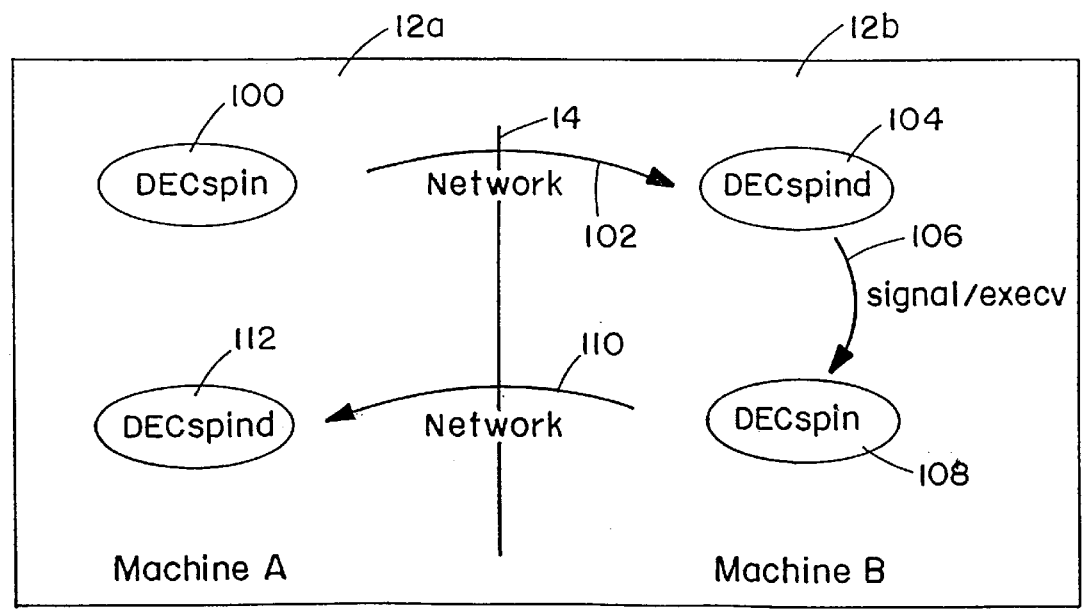
FIG. 4 is a block diagram showing the one-way connections established between two workstations to implement a two-way video teleconference.

FIG. 4 shows a schematic model of two workstations 12a and 12b connected across network 14 during a two-way video teleconference run under the DECspin application. Each "two-way" video teleconferencing connection established between two workstations is composed of separate "one-way" connections. Each one-way connection operates in a "data pushing" mode. That is, audio and video data are "pushed" from the originating workstation to the receiving workstation. This "push" model provides a high degree of security since it prevents another network user from remotely activating workstation's audio and video from across the network.

To originate a video teleconference call to another workstation, a first workstation 12a (Workstation A) executes a local DECspin application program 100 which acts as a "master". DECspin "master" 100 first establishes a one-way network connection 102 with a second workstation 12b (Workstation B) by invoking execution.of a DECspind "slave" application program 104 on Workstation B. Digitized audio and video data are sent from Workstation A by DECspin application 100 to Workstation B where they are received by the DECspind application 104. Furthermore, DECspind application 104 signals 106 the user of Workstation B to indicate that a video teleconference call has been received from Workstation A. In response to the signal, a local DECspin "master" application program 108 on Workstation B establishes a separate one-way network connection 110 with Workstation A by invoking execution of a DECspind "slave" application program 112 on Workstation A. If the DECspin application 108 on Workstation B is not currently executing when the signals 106 occur, the DECspin application 108 is executed and places a return call to Workstation A. The return call to Workstation A causes the execution of DECspind application program 112. Audio and video signals from Workstation B are sent by DECspin application 108 to Workstation A where they are received by DECspind application 112 to complete the two-way video teleconferencing connection between the workstations.

Figure 5A:
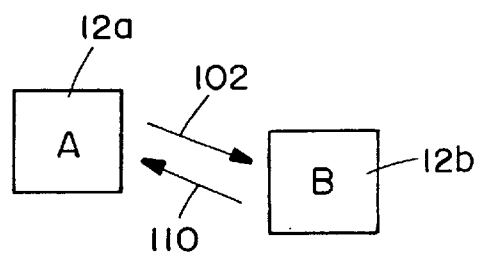
FIGS. 5a–5c are block diagrams illustrating the multiple one-way video teleconferencing connections established between three workstations joined in the same teleconference.
Figure 5B:
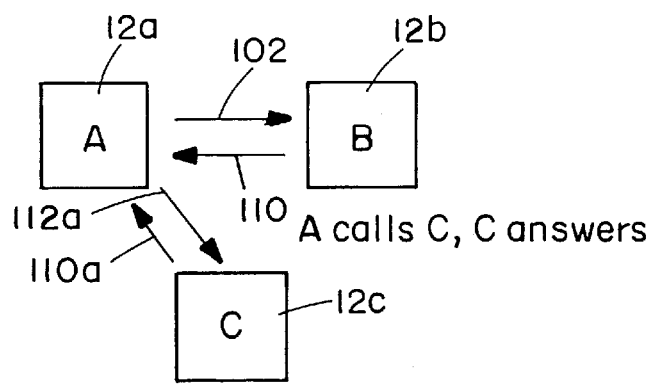
Figure 5C:
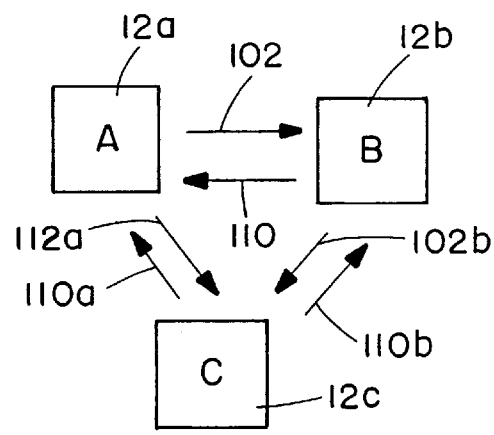

FIG. 5a symbolically shows the two one-way video teleconferencing connections of FIG. 4 between Workstation A and Workstation B. FIGS. 5b and 5c symbolically show the addition of a third workstation 12c (Workstation C) to the video teleconference. As shown in FIG. 5b, Workstation A first establishes a video teleconference with Workstation C independent of Workstation A's video teleconference with Workstation B. This new video teleconference is invoked by Workstation A in a manner identical to the invocation of the conference between Workstation A and Workstation B as shown in FIG. 4, i.e., by creating two one-way connections 102a and 110a between the workstations using DECspin and DECspind application programs running on the two workstations.

Once a video teleconference between Workstation A and Workstation C is established, Workstation C and Workstation B likewise establish two one-way connections 102b and 110b as shown in FIG. 5c to complete the video teleconferencing connections. This can occur by either Workstation B calling Workstation C, or by Workstation A "joining" all the workstations into the same conference by sending a "join" control message to each of the other workstations. Upon receipt of the "join" message, each workstation places a call to each other, unconnected workstations. Thus, each workstation participating in a particular video teleconference establishes and maintains a two-way video teleconference connection with each other workstation in the teleconference. In this manner, a teleconference participant can control what each other participant receives from that workstation, e.g., muting audio or pausing video to certain participants while remaining active to other participants. Furthermore, if a participant has a workstation which can only operate at a limited capacity, each participant can treat that workstation differently from the other workstations, without affecting the overall performance of the video teleconference for the other participants. For example, an audio only workstation can still participate in a teleconference without affecting the video distribution among the other workstations.

It should be noted that each workstation will run only a single DECspin application, which may establish a connection with one or more remote workstations. However, each workstation will execute one DECspind "slave" application session for each workstation to which a video teleconference connection is established. That is, each workstation runs a single DECspin "Master" application, but may run multiple DECspind "Slave" applications simultaneously.

In one preferred embodiment, a single "master" DECspin application can be connected to up to seven DECspind "slave" applications simultaneously. Further, all the DECspind applications need not be members of the same video teleconference. For instance, one workstation may simultaneously be connected to two separate video teleconferences, one with three members and one with four members, for a total of seven DECspind applications driven from a single DECspin application. The members of each conference can only see and hear the members of the same conference. Any workstation common to both conferences can "join" the conferences, in which case all seven members will be joined into a single conference where all can see and hear each other.

Figure 6:
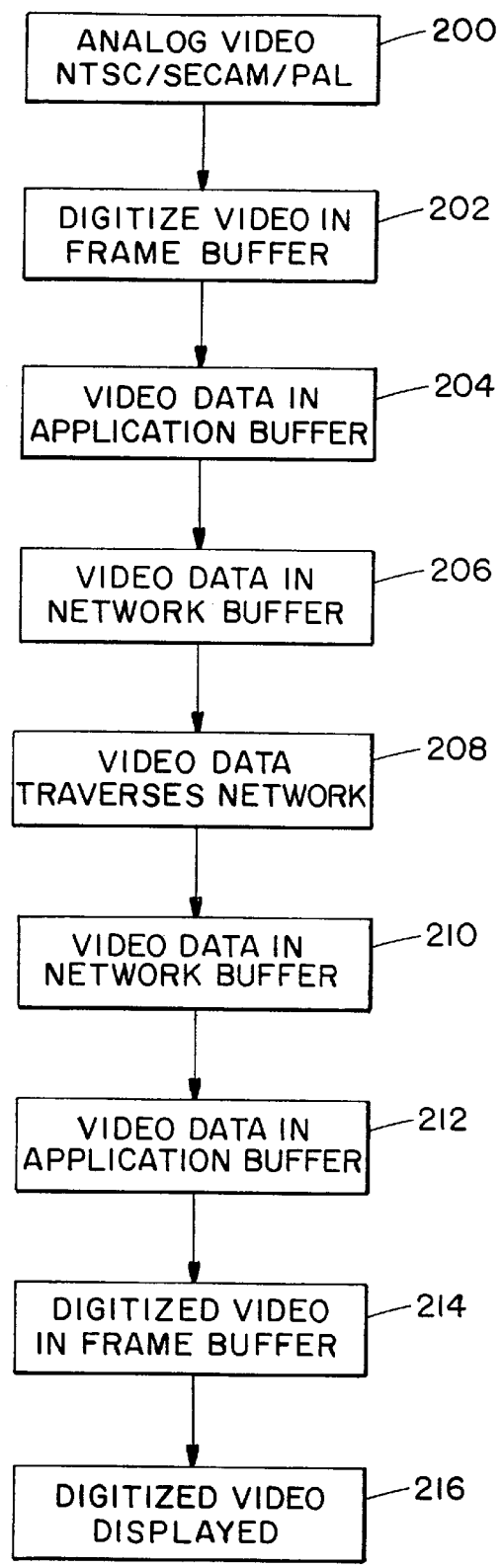
FIG. 6 is a flowchart illustrating the flow of video during a video teleconference.

FIG. 6 is a block diagram showing the flow of video from one workstation to another. The video data source (38 or 40 of FIG. 2) provides standard NTSC, SECAM, or PAL analog video signals 200 which are digitized and stored 202 in a video frame buffer 35 by the frame grabber 34 (FIG. 2). Once an entire video frame has been digitized and stored in the frame. buffer, the entire frame of video data is transferred 204 to an application buffer in main memory 22 (FIG. 2) which is assigned to the DECspin application. Once the video data has been transferred to the application buffer, the video frame grabber can begin to digitize and store the next video frame in the frame buffer.

The digitized video data in the DECspin application buffer is next packaged for decoding and reconstruction by the receiving DEcspind application, and is sent to the network transport buffer 206. The video data in the network buffer are packetized according to the network protocol in use, e.g., TCP/IP or DECnet, sent 208 across the network, and received 210 into a receiving network buffer. The video data is reconstructed from the network protocol packets and sent 212 to a DECspind application buffer in main memory 22 (FIG. 2) of the receiving workstation. The video data are accumulated into the DECspind application buffer until a full frame of video has been received. Graphics are added to the video to form a composite video image for display. The composite video image is then sent 214 to the frame buffer from which the digitized composite video image is converted for display 216 on the workstation monitor.

Figure 7:
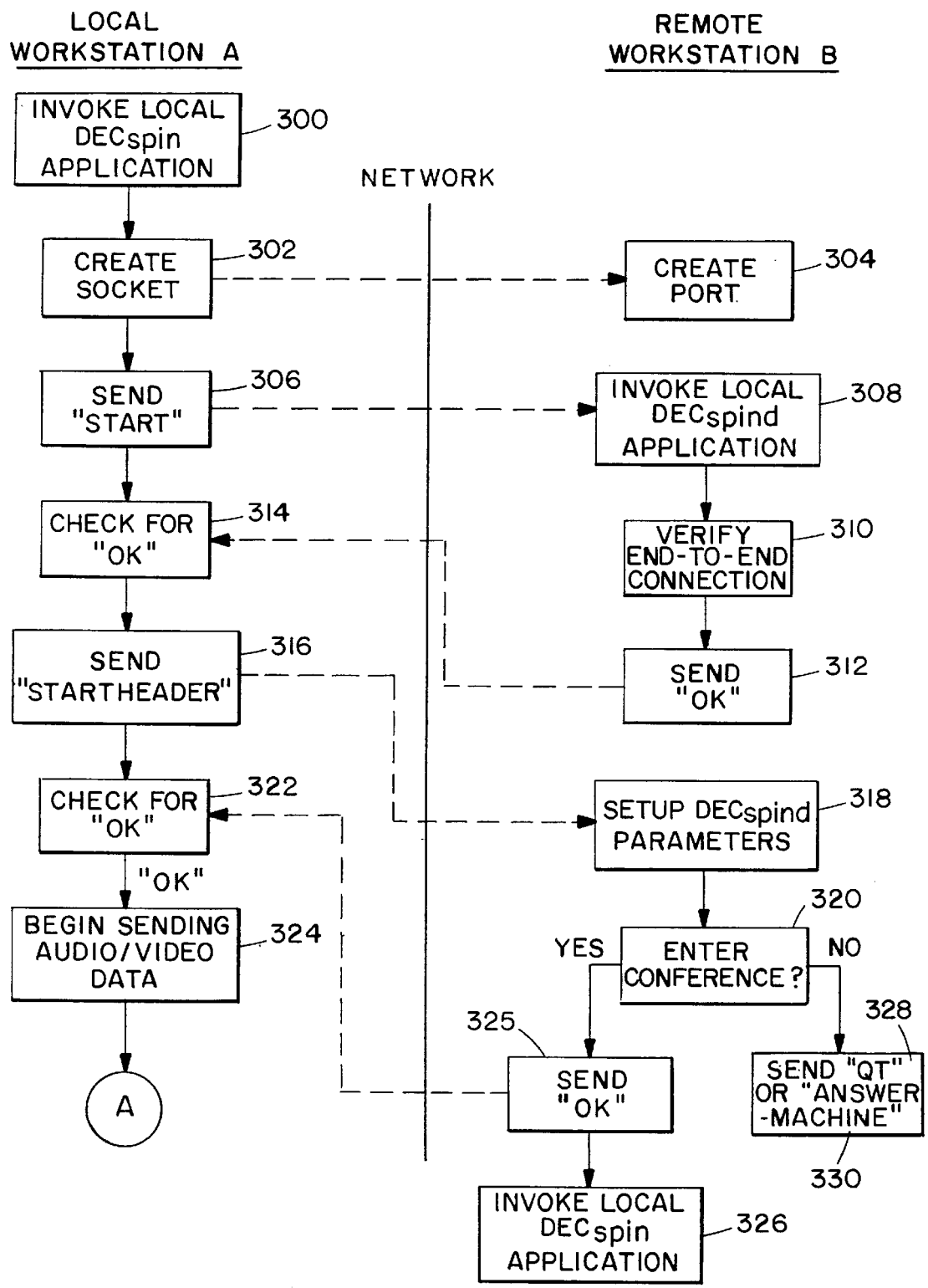
FIG. 7 is a flowchart illustrating the teleconferencing protocol of this invention for establishing a video teleconference connection between two workstations.

FIG. 7 is a flowchart showing the commencement of a video teleconference between a local workstation, Workstation A, and remote workstation, Workstation B. To begin a teleconference, the user of Workstation A invokes 300 the execution of the local DECspin application. The executing DECspin application causes the creation of a network "socket" 302 through a standard UNIX system call. Creation of the socket on Workstation A causes the creation of a corresponding "port" 304 on the remote Workstation B. This "socket-to-port" connection establishes a peer-to-peer connection for the DECspin and DECspind applications running on the two-connected workstations. That is, data put into the "socket" on Workstation A are transferred to the port on Workstation B via a standard network protocol such as TCP/IP or DECnet. UNIX treats the established socket as a standard file descriptor to which the DECspin application simply sends the data stream to be transferred to Workstation B. Thus, this data transfer operation is transparent to the DECspin application which simply accesses the "socket" through standard UNIX calls.

Once the "socket" to Workstation B is established, DECspin sends a START message 306 through the "socket" to Workstation B. FIG. 8 shows the format of the START message, which is simply a two byte long data string.

Upon receipt of the START message, Workstation B invokes execution 308 of a DECspind "slave" application which connects to the previously created port 304 to receive data from the "socket" on Workstation A. Once the DECspind application verifies 310 this end-to-end connection between the two workstations, DECspind sends 312 an OK acknowledgement message through the "port" back to the DECspin application. FIG. 9 shows the format of the OK message, which is simply a two byte data stream.

Upon receipt of the OK message from the "socket," the DECspin application sends 316 a STARTHEADER message through the "socket" to the DECspind application which is used to set up 318 the parameters for the current video teleconferencing session. FIG. 10 shows the format of the STARTHEADER message, the fields of which convey the parameter information required by the DECspind application. These parameter fields include a video width field 400 and a video height field 402 for setting the initial DECspind picture size. A bits per pixel field 404 sets DECspind to display either a black and white image (8 bits) or a true color image (24 bits). A frame rate field 406 sets the desired initial frame rate. A frame count field 408 sets the number of frames expected to be sent during the video teleconference. The value of this field is set to −1 for a live video teleconference (to indicate infinity) where the total number of frames-to be sent is indefinite. Otherwise, the actual number of frames to be transferred during the session is entered into the field, e.g., for a video message of predetermined duration. A login/user handle field 410 identifies the calling party and is used by DECspind to set up the return audio and video connections from Workstation B to Workstation A. Finally, a DTP (DECspin teleconference protocol) flag field 412 conveys multiple single bit flags which indicate particular operational modes such as video compression type used (if any) audio encoding type used, whether to expect audio, video, or both, or how DECspind should respond to certain commands.

Once DECspind receives the STARTHEADER and determines 320 that it will participate in the video teleconference with Workstation A, it issues another OK message to the DECspin application on Workstation A. The receipt 322 of this OK message causes the DECspin application to begin transmission 324 of audio and video data to the DECspind application on Workstation B.

Furthermore, when the user answers the call the DECspind application invokes execution of its own local DECspin application, which establishes a return connection for sending return audio and video data from Workstation B to Workstation A, to complete the two-way video teleconference. The DECspin "master" application now running on Workstation B establishes communications with a DECspind "slave" application on Workstation A in a process equivalent to that just described with respect to establishing communications between workstation A and workstation B. In this case, however, Workstation B is viewed as the local workstation, and Workstation A is viewed as the remote workstation.

With respect to the invocation 326 of the DECspin application on Workstation B, this may occur in one of two ways. If there is no DECspin application currently running on Workstation B, then DECspind initiates execution of the DECspin application, and passes the required parameters to the DECspin application through the application invocation command line. If the DECspin application is already running on Workstation B (e.g., supporting another video teleconference in progress), the DECspind application will append the parameters received via the STARTHEADER message into an information file used by the executing DECspin application. This information file is in turn used to control execution of the DECspin application. Only one DECspin application may be executing on a workstation at one time. However, multiple DECspind applications may be running on the same workstation.

Alternatively, if the DECspind application running on Workstation B receives the STARTHEADER message and does not want to, or cannot participate in the video teleconference, it returns 228 a QUIT message to the DECspin application on Workstation A. FIG. 11 shows the format of the QUIT message, which is a two byte data string. Upon receipt of the QUIT message, the DECspin application on Workstation A terminates the connection with the DECspind application on Workstation B.

As another alternative, the DECspind application running on Workstation B can respond to the STARTHEADER like a telephone answering workstation by returning an ANSWERMACHINE message back to the DECspin application. FIG. 12 shows the format of the ANSWERMACHINE message which is also a two byte data string. The DECspin application running on Workstation A allows the user to respond to the ANSWERMACHINE message by sending a fixed length (typically 20 seconds) audio and video message to the DECspind application on Workstation B where it is stored in a file for deferred playback by the user. The audio and video message may also be viewed by the user of workstation B as it is arriving for storage, similar to "screening" an incoming telephone call.

FIG. 13 shows the format of a CONTROL message, the fields of which convey control information and commands between workstations participating in a video teleconference. Specifically, a two byte identifier field 450 identifies the CONTROL message. At which field 452 identifies the type of control message to follow, and a length field 454 indicates the length of the control message. A flag field 456 conveys other information about the CONTROL message to the receiving workstation, for instance whether or not an acknowledgement message should be sent to the originator of the CONTROL message upon its receipt.

One type of CONTROL message is a "JOIN" message. This message is sent by a local workstation to all remote workstations currently participating in a video teleconference with the local workstation to join all the workstations into the same video teleconference. As discussed above, a workstation may carry on more than one video teleconference simultaneously without the other participants being connected to each other. Upon receipt of a "JOIN" CONTROL message, each of the remote workstations places a video teleconference call to each of the other remote workstations which are currently connected to the local workstation but not to that remote workstation. In this manner, individual dual one-way video teleconferencing connections are established between each of the workstations that has been "joined" into the teleconference. It should also be noted that any workstation can leave the teleconference without affecting the teleconference among the removing workstations by simply terminating its video teleconference connection to each of the workstations.

Figure 14:
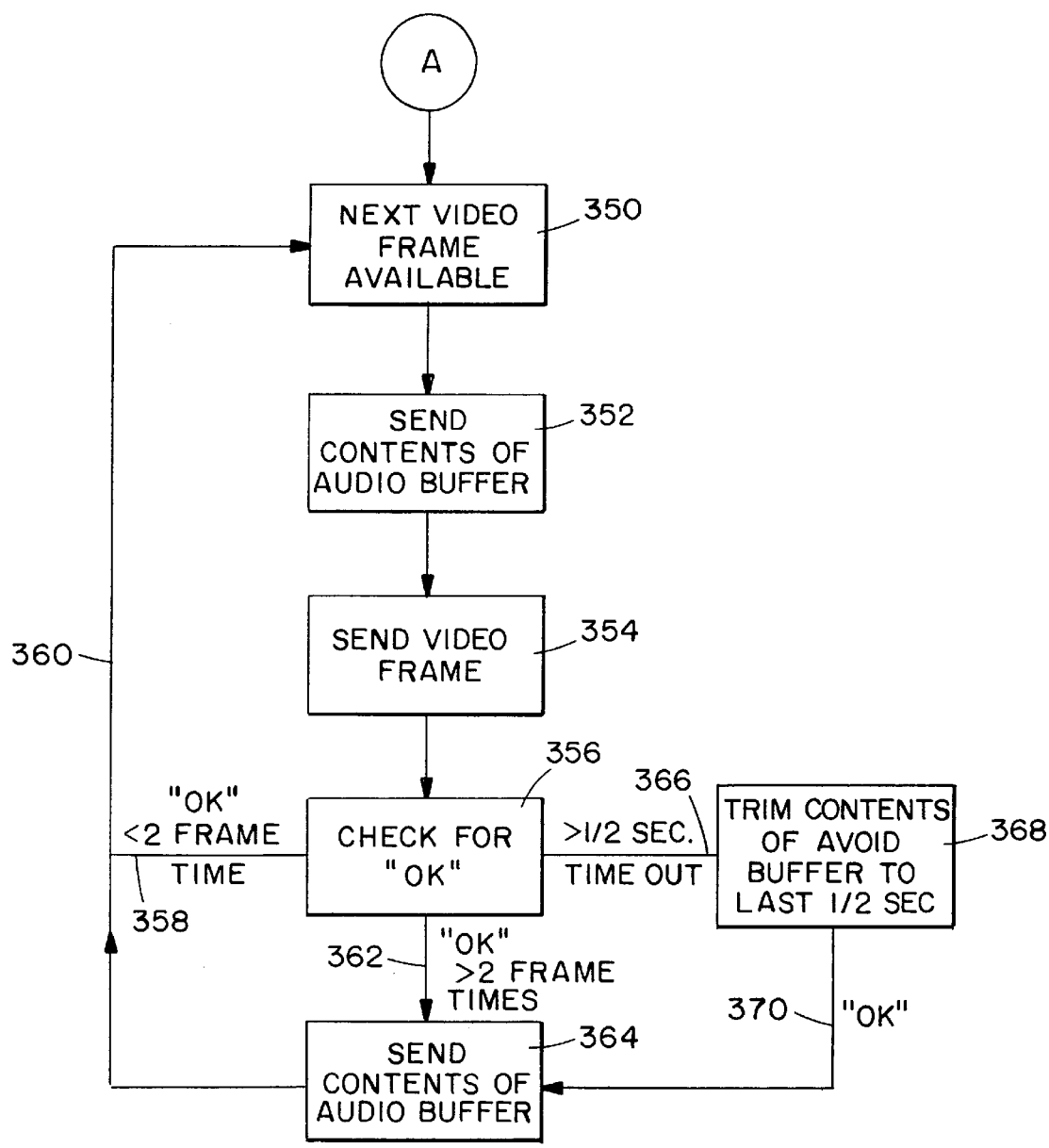
FIG. 14 is a flowchart showing the audio and video data transfer sequence of the video teleconferencing protocol of this invention.
Figure 15:
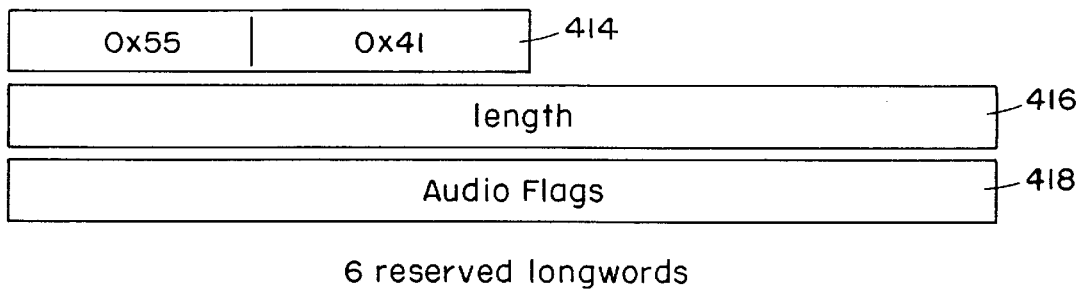
FIG. 15 shows the format of the AUDIOHEADER message of the video teleconferencing protocol of this invention.

FIG. 14 is a flowchart showing the synchronized transmission of digitized audio and video data from a DECspin application running on a local workstation, Workstation A, to a DECspind application running on a remote workstation, Workstation B. Video data are collected on a continuing frame by frame basis. One frame is collected and stored in the frame buffer of the frame grabber 34 (FIG. 2) until the frame is transferred to the DECspin application buffer in main memory 22 (FIG. 2) for transmission across the network to a DECspind application, or until the frame is discarded to make room for collection of a new video frame. Digitized audio data are collected into an audio data buffer. The audio data is drawn out of the audio buffer by the DECspin application which sends the audio data as a continuous stream to the DECspind application.

The audio and video data sent across the network can be modeled as frames of video data inserted into a continuous stream of audio data. In general, the DECspin application will not discard audio data, but will discard video frames as necessary. Since the ear differentiates sound and the eye integrates images, breaks in the audio are more objectionable to a listener than breaks in the video are to a viewer. As a result, the highest priority of the DECspin application is to deliver a continuous, unbroken digitized audio stream to the DECspind application. On the other hand, video frames are routinely discarded dependent on network throughput, and other workload factors.

After a video frame has been digitized and stored in the frame grabber buffer, the frame is made available 350 to the DECspin application for transfer to the DECspind application running on Workstation B. Digitized audio stored in the audio buffer, up to the time when the frame becomes available, is sent 352 first to the DECspind application. The DECspin application begins the audio data transmission by sending an AUDIOHEADER message through the "socket" to the DECspind application. FIG. 14 shows the format of the AUDIOHEADER message, the fields of which convey information about the audio data to follow. Specifically, a two byte identifier field 414 identifies the AUDIOHEADER message, a length field 416 indicates the amount of digitized audio data to follow the AUDIOHEADER message, and an audio flag field 418 indicates parametric information about the audio data. One such audio flag, for instance, indicates the type of audio encoding used to digitize the audio signal, e.g., mu-law encoding. Packets of up to 16 kB each of audio data are then sent to the DECspin "socket" immediately following the AUDIOHEADER message. The audio data packets are reassembled into a continuous audio data stream by the receiving DECspind application, and the audio is sonically reproduced.

Figure 16:
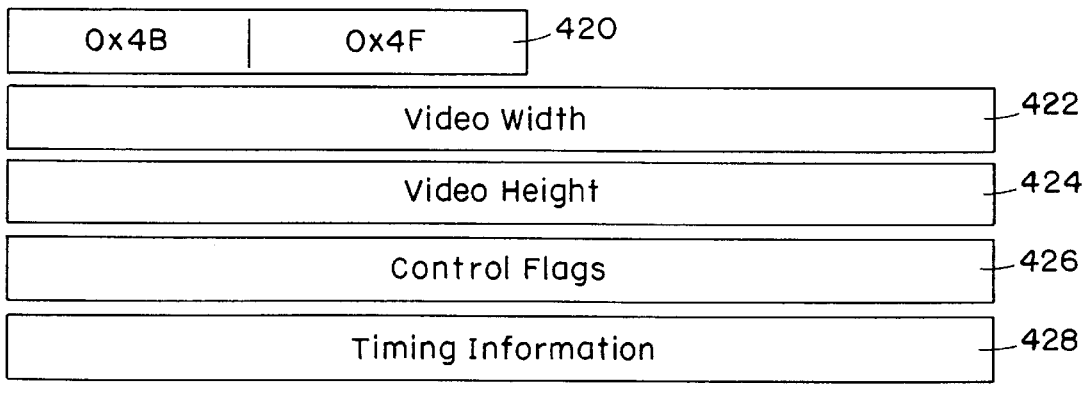
FIG. 16 shows the format of the VIDEOHEADER message of the video teleconferencing protocol of this invention.

Next, the frame of available video data 350 is sent 354 from the DECspin application to the DECspind application immediately following the audio data. The DECspin application begins the video frame transmission by sending a VIDEOHEADER message through the socket to the DECspind application. FIG. 16 shows the format of the VIDEOHEADER message, the fields of which convey information about the frame of video data to follow. Specifically, a two byte identifier field 420 identifies the VIDEOHEADER message. A video width field 422 and video height field 424 indicate the size of the video frame to follow the VIDEOHEADER message. A control flag field 426 conveys parametric information about the video data frame. Finally, a timing information field 428 carries a time stamp which helps the DECspind application to realign the audio and video data for synchronized reconstruction at workstation B. The time stamp is a numerical value corresponding to the byte count of the continuous audio stream taken at the end of the current video frame.

A full frame of digitized video data is sent from the DECspin application to the DECspind application immediately following the VIDEOHEADER message. The DECspin application then stops sending data through the "socket" 356 until it receives an OK message (FIG. 9) from the DECspind application which acknowledges receipt and successful reconstruction of the full video frame.

The video frame data are broken into data packets of 32 kB or less to facilitate efficient transmission through the "socket" and across the network by the TCP/IP protocol. Although the video data could be sent through the "socket" as a single, unbroken stream of approximately 300 kbytes of data (for a black and white image having 640 by 480 pixels, each 8 bits deep), any error occurring at the TCP/IP protocol level would require retransmission of the entire 300 kbyte data stream. Therefore, by breaking the data into smaller 32 kbyte maximum size packets, any error at the TCP/IP protocol level will only require retransmission of at most 32 kbytes of video data. This significantly increases the efficiency of video transmission across the network which results in a higher overall video throughput.

The DECspind application collects the received video data packets into an application buffer until an entire frame of video data has been collected. At that time, the DECspind application proceeds to display the received video frame to the workstation user, and issues an OK message (FIG. 9) to the DECspin application to acknowledge receipt and successful reconstruction of the video frame.

Figure 17:
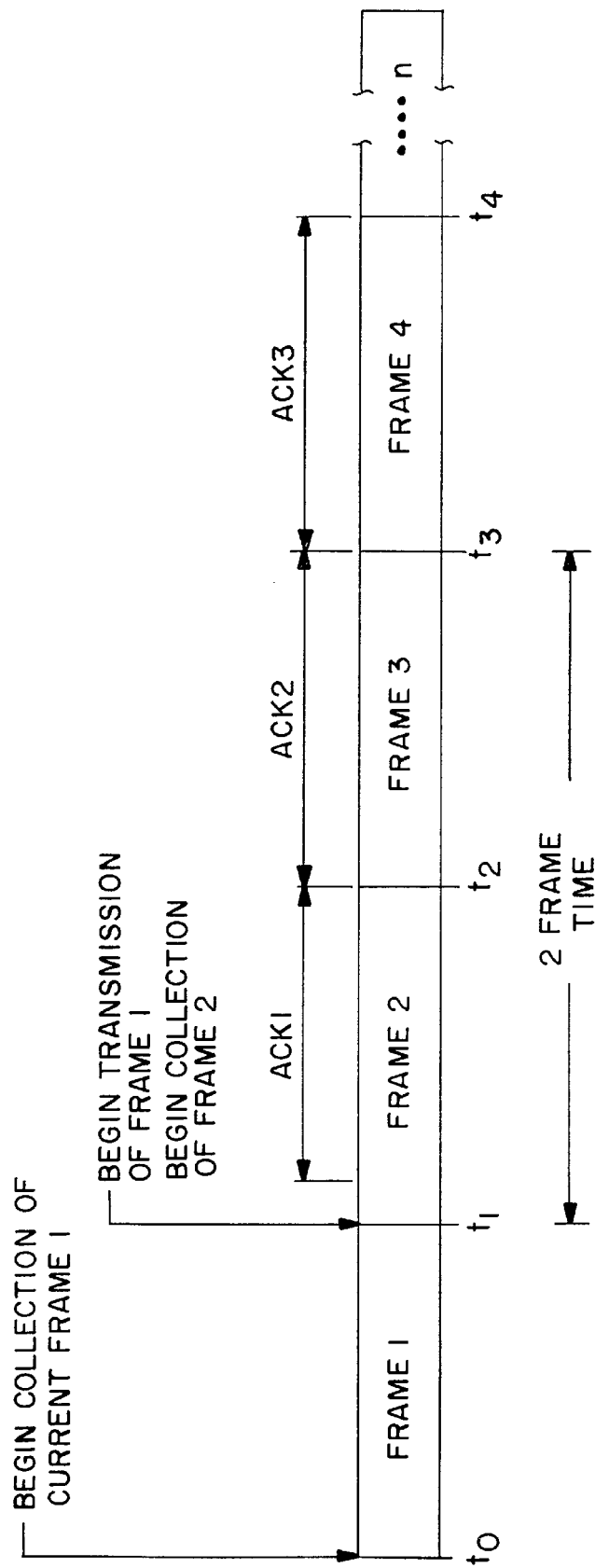
FIG. 17 shows a timing diagram of the audio and video data synchronization of the video teleconferencing protocol of this invention.

The DECspin application responds to the OK message sent by the DECspind application in one of three ways. The response depends on when the OK message is received relative to the time required for the video frame grabber to make the next video frame available, i.e., "the frame time" between available frames. FIG. 17 illustrates the timing and operations associated with the receipt of the OK message by the DECspin application, and is discussed in detail below.

The first situation occurs when DECspin receives the OK message within two frame times 358 (FIG. 14) of sending the last available video frame to the DECspind application. In this case, DECspin returns 360 to determine if 350 a new video frame is available from the frame grabber buffer, and the entire process of sending audio and video data to the DECspind application is repeated.

The second situation occurs when DECspin receives the OK message beyond two frames times 362, but less than a "time out" time period, after sending the last available video frame to the DECspind application. In this case, DECspin first sends 364 the digitized audio accumulated in the audio buffer to the DECspind application to prevent loss of this audio data which would result in a break in the continuity of the reconstructed audio. DECspin then proceeds to return 360 and determine 350 if a new video frame is available from the frame grabber buffer for transmission, and the entire process of sending audio and video to the DECspind application is repeated.

The third situation occurs when the DECspin application has not received an OK message within a specified "timeout" period 366. In a preferred embodiment, the timeout period is set at one half second. A timeout can occur when, for instance, the network is reset, or a processor intensive operation is being performed at the receiving workstation which competes with the DECspind application for workstation resources. In timeout situations, loss of part of the continuous audio signal as well as part of the video signal is unavoidable. In this case, the DECspin application continually trims 368 the audio buffer to only retain audio data corresponding to the last time out interval, which prevents overflow of the audio buffer. For instance, where the timeout interval is one half second, DECspin only retains the last one half second of audio data in the audio buffer. Finally, when DECspin receives the OK message 370 from the DECspind application, DECspin first sends 364 the last half second of digitized audio accumulated in the audio buffer, and then proceeds 360 to determine 350 if a new frame of video data is available from the frame grabber buffer, and the entire process of sending audio and video to the DECspind application is repeated.

FIG. 17 illustrates a more detailed timing analysis of these three video frame acknowledgement situations. At time $t_0$, the frame grabber begins to capture a digitized video frame in its buffer, which becomes available for transmission by the DEcspin application at time $t_1$. At time $t_1$, video FRAME1 is transferred from the frame grabber buffer to the DECspin application buffer in main memory, and the frame grabber begins to accumulate the next frame FRAME2, in the frame grabber buffer.

The DECspin application then begins to send the audio and video data to the DECspind application shortly after time $t_1$. If the acknowledgement OK message for FRAME1 is received from DECspind before the next video frame, FRAME2, is available at time $t_2$, i.e., during the ACK1 interval, then DECspin waits until time $t_2$ to begin sending the audio and video FRAME2 data. If the acknowledgement OK message for FRAME1 is received from DECspind after FRAME2 is available at time $t_2$ but before the next video frame, FRAME3, is available from the frame grabber buffer at time $t_3$, i.e., during the ACK2 interval, then DECspin begins immediately sending the audio data accumulated in the audio buffer and video frame FRAME2 to the DECspind application.

In the case where the acknowledgement OK message is received greater than two frame times after video frame FRAME1 became available from the frame grabber buffer at time $t_1$, e.g., after time $t_3$ during the ACK4 time interval, the currently available video frame is FRAME3 which became available at time $t_3$. Since the frame grabber has only a single frame buffer, the FRAME2 data is discarded, and not sent to the DECspind application. In this manner, only the freshest video frame is sent across the network. Regardless of when the OK message is received after the two frame timeout limit, the last available (and freshest) video frame is sent to the DECspind application, and all other intervening video frames are discarded. The last available video frame is sent shortly after the OK message is received.

The DECspind application synchronizes the received audio data stream with the video frame data to be displayed by comparing the audio data stream to the time stamps of the received video frame data. Due to system time delays and the order of audio and video data transmissions, a frame or video will be available for display by the DECspind application prior to reproduction of its corresponding audio. A typical system time delay is about ¼ to ½ second for the audio signal. Audio data received by the DECspind application is accumulated into a DECspind audio buffer, and read out for sonic reproduction on a continuous basis. DECspind keeps track of the number of audio data bytes received from the DECspin application, and thus generates a continuously updated audio time stamp. As discussed above, each video frame is preceded by a VIDEOHEADER (FIG. 16) message which includes a timing information field 428 holding a time stamp value corresponding to the audio byte count at the end of that video frame time. DECspind reads this time stamp information and delays displaying the associated reconstructed video frame until an audio time stamp generated from the received audio data stream matches the video frame time stamp. The video frame is displayed when the match occurs. In this manner, the audio always appears to be synchronized to the displayed video frames, regardless of the video frame rate or the loss of intervening video frames.

Graphical User Interface

Figure 18:
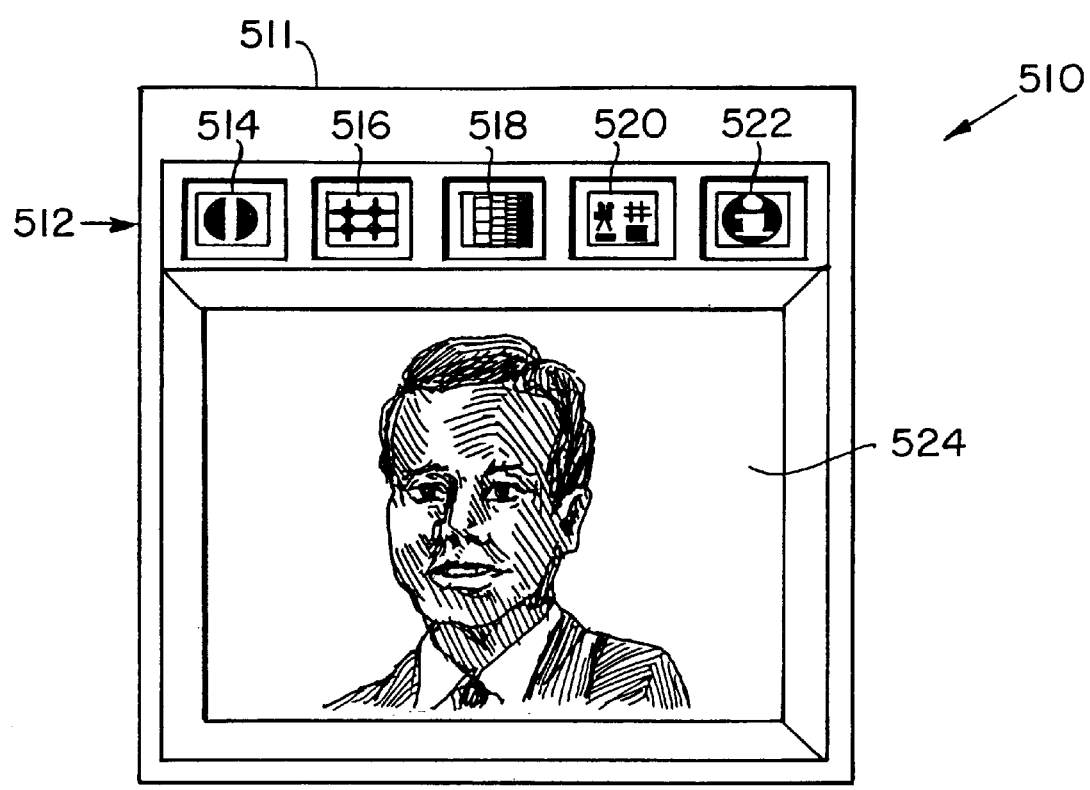
FIG. 18 shows the top level graphical user interface window for controlling a video teleconferencing session of this invention.

FIG. 18 shows a graphical user interface (GUI) window 510 displayed on the monitor of a workstation 12 (FIG. 2) for controlling a DECspin video teleconferencing session. Teleconferencing session window 510 is generated by the DECspin application using X Windows managed by a Motif manager, and is displayed as a graphic window on the color monitor 30 of the multimedia workstation 12 (FIG. 2). DECspin session window 510 provides the user of a networked multimedia workstation with an interface for accessing the top level video teleconferencing functions of the DECspin application.

When a user invokes the DECspin application to begin a video teleconference through, for instance, a UNIX command, the DECspin session window 510 appears on the workstation color monitor. A window title bar 511 identifies the DECspin application and version number to the user. From this point on, all teleconferencing functions are accessed through the graphical interface associated with this and other Motif managed X Windows graphics. Furthermore, through this graphical interface, the user can also store and playback audio/video "filmclip" messages.

DECspin application window 510 includes a Motif menu bar 512 having a plurality of user selectable "pushbuttons" 514, 516, 518, 520, and 522. These "pushbuttons" are presented as a Motif RowColumn widget which controls all the top level DECspin functions available to the user. Each of the "pushbuttons" presented to the user through the Motif windows are activated with a graphical pointing device such as a mouse. A "pushbutton" may for instance be activated by moving the mouse to cause a graphical pointer to enter the area of the pushbutton to select that button, and then activating a mechanical switch on the mouse to activate the corresponding "pushbutton". Furthermore, the "pushbuttons" also lend themselves to use with a touch screen display, where the user simply touches the "Pushbutton" on the screen to activate it. An activated "pushbutton" is highlighted to indicate activation.

The DECspin graphical user interface has no first or second level language specific functional controls, and thus DECspin appears to the user as an internationalized application. As such, all top level function pushbuttons 514–522 of menu bar 512 are identified by iconic symbols which have been internationalized where possible.

Activation of one of the Motif "pushbuttons" of menu bar 512, in most cases, causes creation of a second level pop-up window. The second level pop-up window in turn, offers the user next level of functional choices associated with the selected top level function.

An audio help, or "talking button", feature is also associated with the Motif "pushbuttons" available for selection by the user. By simultaneously selecting a Motif "pushbutton" while holding down a keyboard "help" key, a stored audio message is audibly reproduced which describes the function of the selected "pushbutton".

A live video image appears in a video window 524 displayed below the menu bar 512. Video window 524 displays the current local image being generated by the frame grabber 34 (FIG. 2) and stored in the video frame buffer 36 (i.e., video window 524 frames that section of the display memory frame buffer in which the video grabber stores each frame of video.) The video window acts as a video "monitor" for viewing local video throughout the video teleconference session. Furthermore, the size of the video window 524 can be changed by using the mouse to move a side or corner of the window. Changing the size of the video window affects the number of pixels encompassed by the window, and thus the number of video pixels to be sent to another workstation during each video frame. Smaller windows achieve a higher frame rate since less data per frame must be sent. Conversely, larger windows achieve a lower frame rate. Thus, the video frame rate for a video conference connection can be adjusted by simply sizing video window 524.

Figure 19:
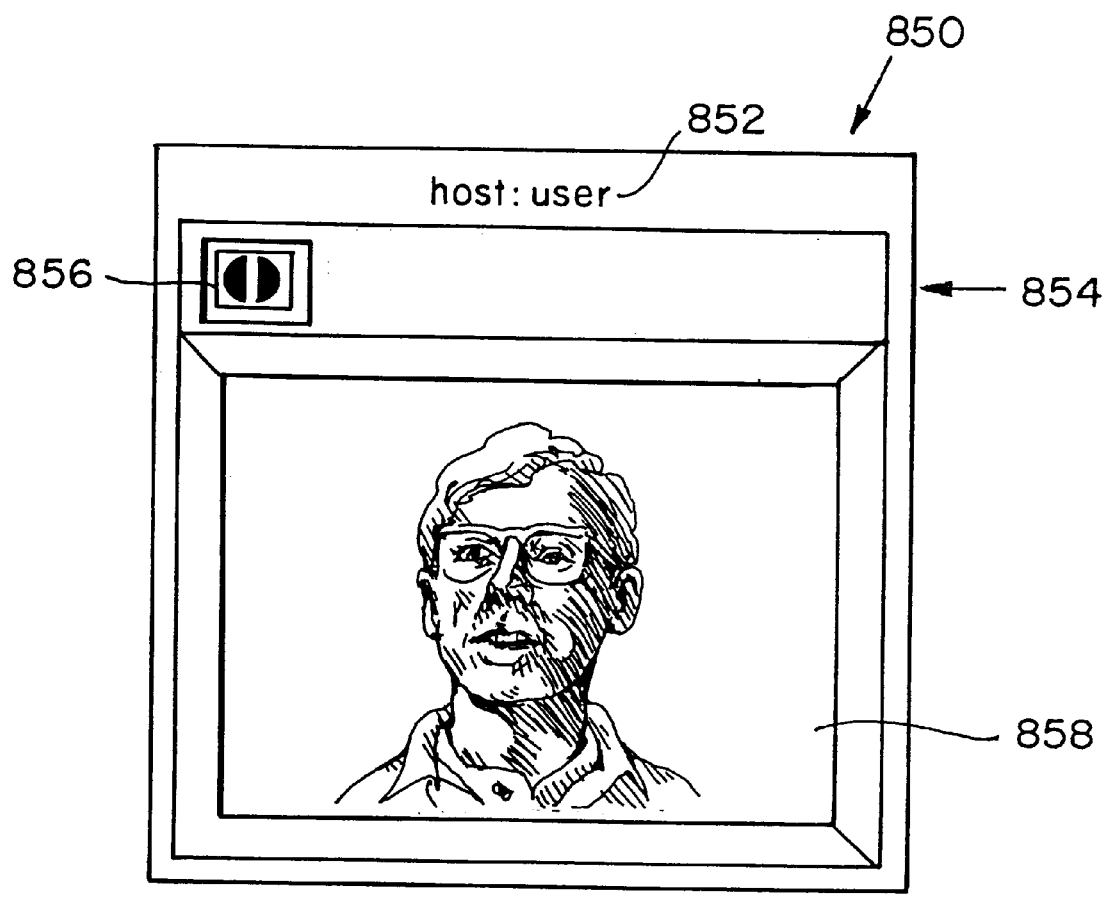
FIG. 19 shows the graphical user interface window for displaying video data received from another workstation during a video teleconferencing session of this invention.

When a called workstation invokes the "slave" DECspind application to receive audio and video from a calling DECspin application, the DECspind application displays a DECspind session window 850 as shown in FIG. 19. The DECspind session window appears similar to the DECspin session window 510 of FIG. 18, except that the title bar 852 displays the identification of the calling party,. and the menu bar 854 can contain only an "exit" pushbutton 856. A video window 858 displays the video data received from the DECspin application. Unlike the video window 524 of the DECspin session window 510, video window 858 of the preferred embodiment is not resizable to change the video resolution since its size depends on the resolution of the video data sent by the "Master" DECspin application. Furthermore, since the video teleconferencing parameters are set by the "Master" DECspin application, no functional controls are provided other than an "exit" control which when activated will terminate the video teleconferencing connection. As an alternative preferred embodiment, a "control" pushbutton can be added to the DECspind session window, which when activated offers the user a limited control set for adjusting the received video image or audible levels. Furthermore, a "monitor" pushbutton can also be added to allow the user to monitor, for instance, the data rate of the incoming video teleconference associated with the DECspind session window.

Referring again to the DECspin application session window 510 of FIG. 18, a functional description of the menu bar 512 "pushbuttons" is as follows. The "exit" pushbutton 514 when activated forces all video teleconferencing connections to the workstation to cease, and for the DECspin application to terminate. Any necessary cleanup of network connections is also done. If any changes to the DECspin configuration occurred during the video teleconference session, a pop-up Motif question box (not shown) prompts the user to either save the changes, restore default settings, or quit. The icon which identifies the "exit" pushbutton 514 is the international symbol for "exit" (i.e., a green circle with a vertical white bar on a white background). This symbol is used on all DECspin pop-up windows to indicate the pushbutton that causes the user to exit that particular pop-up window.

Figure 20:
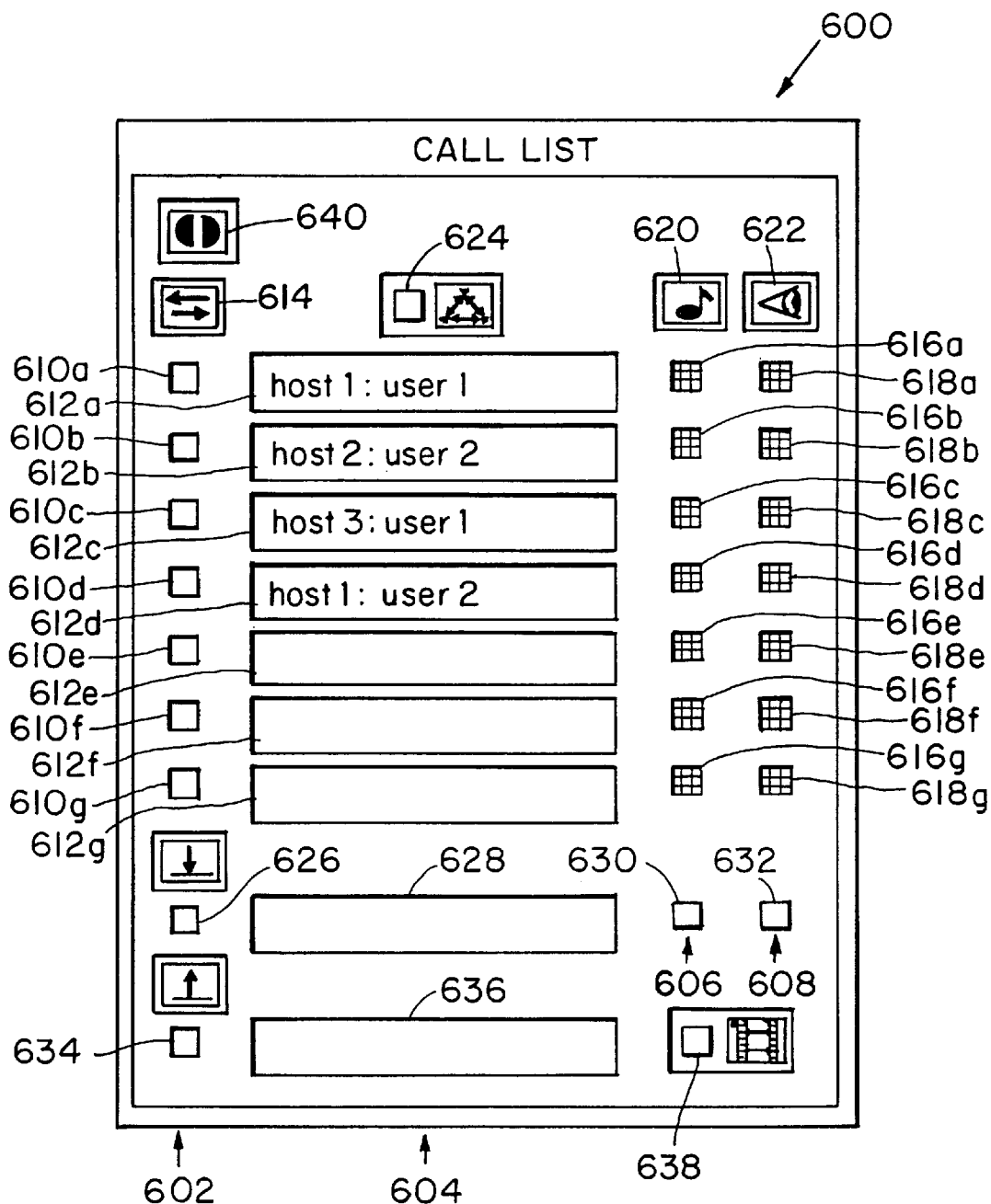
FIG. 20 shows a second level graphical user call list interface window for establishing the video teleconferencing connections to other workstations of this invention.

The "connections" pushbutton 516 is used to establish video teleconference connections between workstations. When activated, this pushbutton causes creation of a second level "call list" pop-up window 600 as shown in FIG. 20. Through the "call list" window the user can add, delete, activate or modify network video teleconferencing connections to other networked workstations. The user can also create and store an audio/video "filmclip" file through this pop-up window. The "connections" pushbutton icon is an international symbol showing a black grid with four intersection points on a white background.

Figure 21:
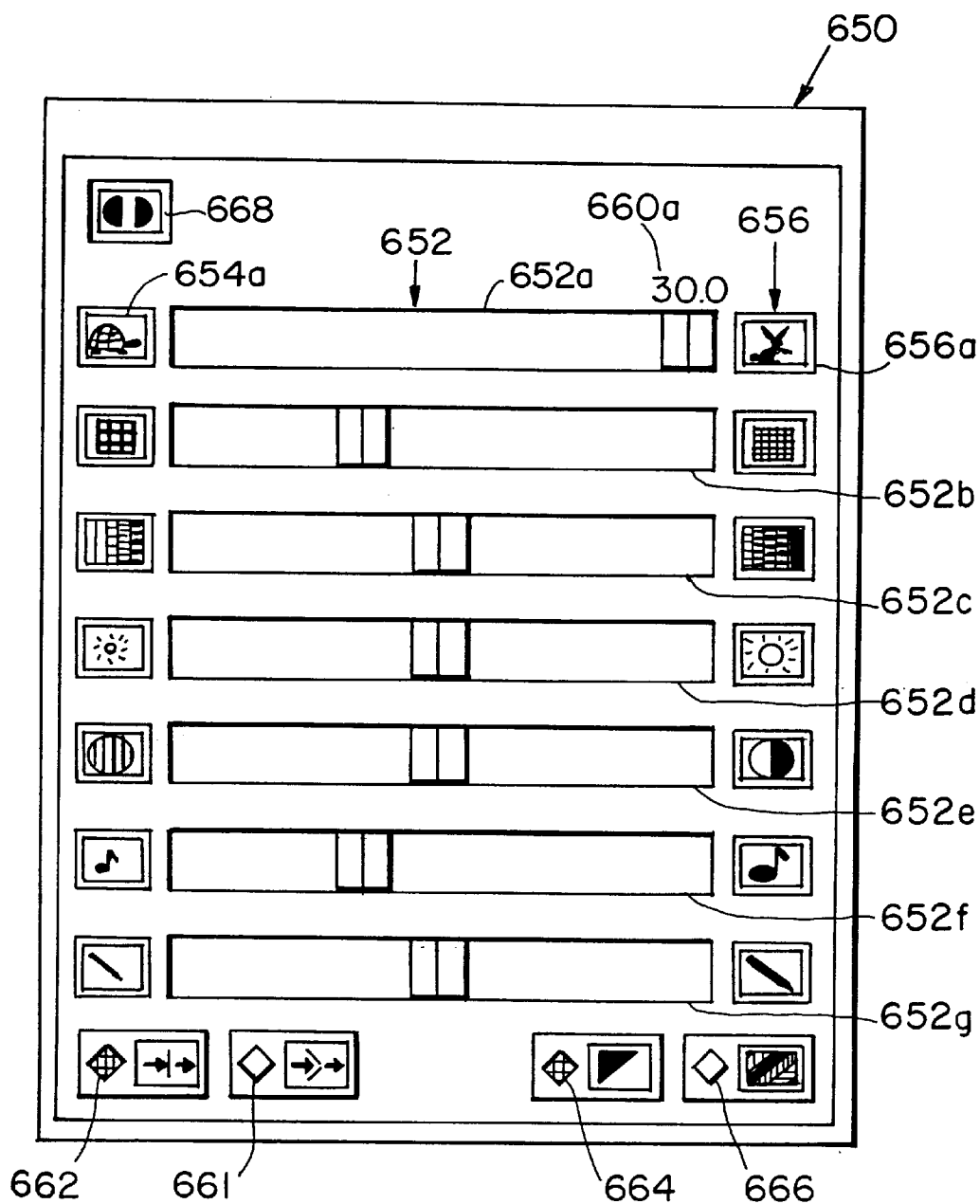
FIG. 21 shows a second level control graphical user interface window for adjusting the parameters for a video teleconference of this invention.

The "control" pushbutton 518 is used to adjust various parameters associated with the audio and video data generated by the workstation and sent to the other video teleconferencing participants. Activation of this pushbutton causes creation of a second level "control" pop-up window 650 as shown in FIG. 21. Through the "control" window the user can adjust transmission parameters including the maximum video frames per second, video hue, video color saturation, video brightness, video contrast, audio volume, and microphone gain. The user can also select between video compression, on or off; color or black and white; and, transmission source, live or stored.

Figure 22:
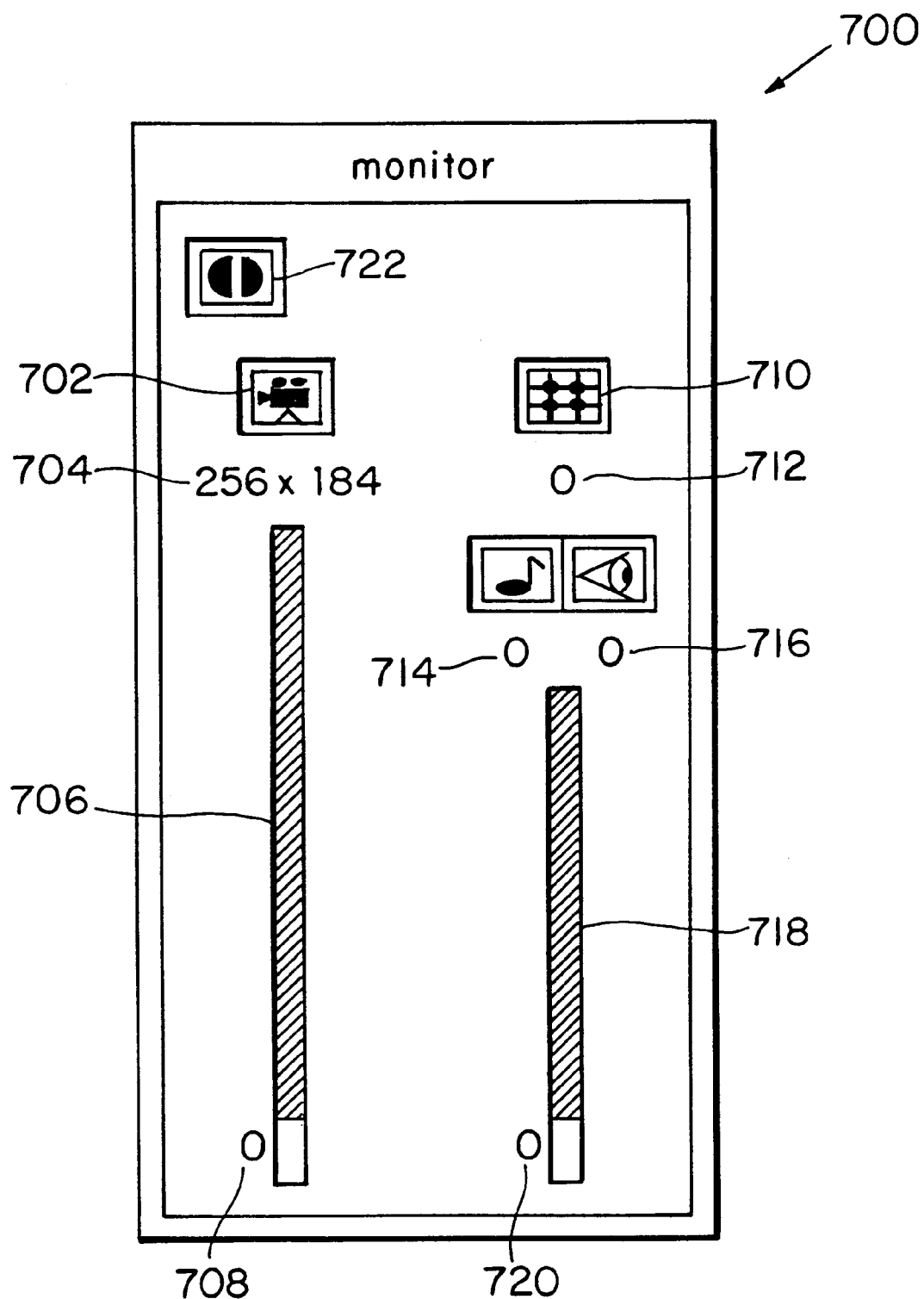
FIG. 22 shows a second level monitor graphical user interface window for monitoring the parameters of a video teleconference of this invention.

The "monitor" pushbutton 520 is used to view various teleconferencing and network system parameters. Activation of this pushbutton causes creation of a second level "monitor" pop-up window 700 as shown in FIG. 22. Through the "monitor" window, the user can monitor the average video frames per second transmission rate, the average network resources consumed by the active DECspin video teleconference, the number of video conference participants, the number of active audio and video connections, and the pixel resolution of the video image generated by the local workstation.

The "help" pushbutton 522 is used to access DECspin on-line documentation. Activation of this pushbutton causes creation of a second level "information" pop-up window 750 as shown in FIG. 23. Through this "help" window the user can access audio video and text based information, instruction, and help on various DECspin features, indexed by subtopics. The "help" pushbutton icon is a blue circle on a white background having a white "i" in its center, which is the international symbol for "information".

Referring to FIG. 20, the "call list" window 600 is activated by selecting the "connections" pushbutton 516 (FIG. 18) of the top level DECspin session window. The "call list" window 600 is a Motif pop-up window which is made up mainly of four columns 602, 604, 606 and 608 of Motif widgets. The widgets of the first column 602 include seven "connect" toggle pushbuttons 610a–610g each associated with a "network host" field 612a–612g, respectively, in the second column 604. To establish a connection with another workstation, the user enters the target workstation host name and user name into a "network host" field of column 604 and activates the corresponding "connect" toggle pushbutton of column 602 to establish the connection. The syntax for this "host network" field is given as "host:user" for TCP/IP, and as "host::user" for DECnet, respectively. If no user is specified, the DECspin application will attempt to contact anyone logged into the targeted host workstation. The associated "connect" toggle pushbutton of column 602 is activated again to cause disconnection from the target workstation. A "connection" icon 614 located above the "connect" toggle pushbuttons helps to indicate their function to the user.

The widgets of the third and fourth columns 606, 608 include seven "audio" toggle pushbuttons 616a–616g and seven "video" toggle pushbuttons 618a–618g, each associated with a "network host" field 612a–612g, respectively. The "audio" toggle pushbuttons of 616a–616g of column 606 determine if the associated "network host" will receive audio from the workstation, and the "video" toggle pushbuttons 618a–618g of column 608 determine if the associated "network host" will receive video from the local workstation. An "audio" icon 620 indicates the function of "audio" toggle pushbuttons 616a–616g, and a "video" icon 622 indicates the function of "video" toggle pushbuttons 618a–618g. Thus, the user can establish a connection with another multimedia workstation (target host) by simply indicating the target host name in a "network host" field 612 and activating the associated "connect" toggle pushbutton 610. Once the connection is established, the associated "audio" toggle pushbutton 616 determines if the multimedia workstation will receive audio, and the associated "video" toggle pushbutton 618 determines if the workstation will receive video.

Upon activation of a "connect" pushbutton of column 602, the DECspin application attempts to call the target host workstation over the network. If a connection cannot be made, a Motif error box (not shown) appears on the local monitor and states what error has occurred. The error box may prompt the user for further instructions, such as retry or cancel.

"Call list" window 600 also includes a "join" pushbutton 624 which, when activated, joins all "network hosts" currently connected to the local workstation into a single video teleconference. This produces an n-way video teleconference between all the network hosts connected to the workstation as indicated by an activated (highlighted) "connect" toggle pushbutton 610a–610g.

The "call list" window 600 also allows the user to redirect audio and video to and from a multimedia file. An output file "connect" toggle pushbutton 626 activates a connection to an output file as specified in an associated output file descriptor field 628. If an output file connection is activated while a teleconference is in progress, a copy of the outgoing transmission from the local workstation is stored to the specified output file. An "audio" toggle pushbutton 630 and a "video" toggle pushbutton 632 associated with the output file descriptor field 628 respectfully determine if audio, video, or both audio and video will be stored to the output file. The audio and video data is stored to the designated output file until the output file "connect" toggle pushbutton is deactivated.

An input file "connect" toggle pushbutton 634 activates playback of an input file containing pre-recorded audio and/or video data, possibly stored earlier by means of the output file "connect" toggle pushbutton discussed above. The input file is specified in an input file descriptor field 636 associated with the input file "connect" toggle pushbutton 634. Furthermore, if the input file is selected for playback while a video teleconference is in progress, the contents of the file are also sent to the conference members as indicated by the active "connect" toggle pushbuttons 610a–610g. In this manner, an audio/video data stream can be sent to and viewed by all conference members simultaneously.

A "filmclip" pushbutton 638 allows a user to view DECspin audio/video messages stored as .SPN files in the conventional system message area, described below. Activation of this pushbutton causes a Motif "file selection box" pop-up window (not shown) to appear which allows the user to select a message file for playback. The message is played back by running the stored audio and video data through a local DECspind application as if the data streams were being sent to the DECspind application by a remote DECspin application.

Finally, the "exit" pushbutton 640 of "call list" 600 terminates the "call list" pop-up window and returns the user to the active teleconference windows established by means of the "call list" window.

When a call is placed to a target host by activating a "connect" toggle pushbutton a "ring box" pop-up window 800 as shown in FIG. 25 appears on the display of the remote workstation being called. Simultaneously, the keyboard bell of the target host workstation is "rung". A DECspind application window 850, shown in FIG. 19, is also displayed on the remote workstation, but with inactive video. The "ring box" window indicates to the user of the target host workstation that a video teleconference call is being attempted with that workstation. The title bar 802 of the "ring box" identifies the calling host workstation and the user who placed the call. No other information (including audio and video) is revealed to the called party unless the call is answered.

The "ring box" 800 offers the called party an "answer" pushbutton 804 and a "busy" pushbutton 806. If the called party activates the "answer" pushbutton, the target workstation will use a local DECspin application to return audio and video to the calling workstation, and will display the received video in the DECspind application window 850 shown in FIG. 19. The received audio is audibly reproduced by the DECspind application. This completes the two-way video teleconferencing connection between the calling and the called workstations.

If the called party activates the "busy" pushbutton 806, the calling party is informed that the called target workstation is busy. Furthermore, the called party can ignore the "ring box". In this case, if there is no answer after a set period of time, e.g., four rings, the calling party is prompted to take further action, such as leave a message or close the call. Still further, the called party can simply "hang up" by activating the "exit" pushbutton 856 of the DECspind application window of FIG. 19.

If a called party does not answer within a predetermined time period, answers busy, or just hangs up, the calling party is prompted with a Motif information box (not.shown) which allows the caller to leave a short audio/video message on the called workstation. This feature works like an answering machine. The maximum length of the message is preset to a reasonable period of time, dependent on the file storage resources of the target system. In one preferred embodiment, the maximum message length is limited to 20 seconds, and is not changeable by the user. The user is presented with a pop-up Motif "countdown" box (not shown) which provides a running indication of the amount of time left while leaving a message.

Messages may be stored in the conventional system message area with, for instance, a .SPN file descriptor extension. Once the caller elects to leave an audio/video message, the DECspin application of the calling workstation directs the audio and video data streams meant for the called workstation to a message file. Upon invocation of the DECspin application, the system message area is checked for any stored .SPN message files. If any are present, the user is presented with a pop-up Motif "file selection box" window (not shown) which allows the user to select and playback any of the stored messages. The message is played back by running the stored audio and video data streams through a DECspind application as if the data streams were being sent by an active DECspin application. Message files may also be discarded through this pop-up window. Furthermore, the system message area can be checked for .SPN message files at any time by activating the "filmclip" pushbutton 638 of the "call list" window 600.

Referring to FIG. 21, the "control" pop-up window 650 is activated by selecting the top level "control" pushbutton 518 (FIG. 18) of the DECspin session window 510. The "control" window is a Motif pop-up window which is made up mainly of a column 652 of sliding scale widget controls, and a column of corresponding icons 654 and 656 located on either side of the sliding scale widgets to indicate the function of the associated sliding scale widget. For instance, the top most sliding scale widget 652a adjusts the maximum video frame rate for the video teleconference. The video frame rate sliding scale widget includes a control gadget 658a which may be moved with the mouse along the length of the sliding scale widget to adjust the maximum frame rate. A digital readout 660a above the sliding scale moves with the control gadget and displays the current frame rate setting. The left side icon 654a shows a "snail" to indicate movement of the control gadget to the left slows the frame rate. Conversely, the right side icon 656a shows a "hare" to indicate movement of the control gadget to the right increases the frame rate.

The remaining sliding scale widgets 652b–652g operate in a similar manner to effect their respective controls. Scale 652b–652g respectively control color hue (red on left, green on right), color saturation, brightness, contrast, audio volume, and microphone gain. Furthermore, "control" window 650 includes two pushbuttons 660 and 661 for enabling and disabling video compression, respectively. Two other pushbuttons 664 and 666 enable black and white, or color video, respectively. Finally, an "exit" pushbutton 668 terminates the "control" window.

Referring to FIG. 22, the "monitor" pop-up window 700, activated by selecting the top level "monitor" pushbutton 520 (FIG. 18) of the DECspin application window 510. The "monitor" window is a Motif pop-up window which includes graphic indicators for displaying certain video teleconferencing parameters and statistics. The displayed statistics are updated periodically, for instance, every five seconds.

Information related to the video image generated by the DECspin application is displayed below a "camera" icon 702. The video image information includes a digital readout 704 of the video image size in horizontal by vertical pixels, and a sliding scale indicator 706 with an associated digital readout 708 for showing the average frame rate. These two parameters are important since the DECspin video window 524 of FIG. 18 may be "sized", as discussed above, to change the number of pixels contained in the image. Changing the number of pixels also effects the video frame rate. Both these video parameters can be monitored by these indicators as the DECspin window is sized.

Information related to the network and active video teleconference is displayed by indicators located below a "connection" icon 710. This information includes digital readouts of the total number of active teleconferencing connections 712, the number of active audio connections 714, and number of active video connections 716. Finally, a sliding indicator 718 and an associated digital readout 720 display the average network consumption. An "exit" pushbutton 722 terminates the "monitor" pop-up window.

Referring to FIG. 23, the "information" pop-up window 750 is activated by selecting the "help" pushbutton 522 (FIG. 18) of the top level DECspin session window 510 and allows the user access to textual and "filmclip" documentation. The "information" window is a second level Motif pop-up window which is made up of a column 752 of user selectable pushbuttons configured as a Motif Radio Box so that only a single pushbutton can be activated at one time. Each pushbutton is labeled with a sub-topic for which help documentation is available. For instance, in the embodiment of FIG. 23, help documentation is available to provide an overview of the video teleconferencing system 754, to help start a conference 756, to help with a specific video teleconferencing feature 758, or to help troubleshoot a video teleconferencing problem 760. Upon activation of one of the topic pushbuttons, a third level "sub-help" window 780 of FIG. 24 appears offering the user a further breakdown of subjects related to the selected topic. For instance, the "sub-help" window of FIG. 24 hows the subjects available to the user after electing the overview pushbutton 754 of FIG. 23.

The "sub-help" window 780 of FIG. 24 is a third level Motif pop-up window having a column of unbuttons 782 and 784 on each side of a center column 786 of subject labels. The left column of pushbuttons 782 activates a bookreader textual documentation system for the corresponding subject. For instance, activation of pushbutton 788 will present the user with text on the workstation display describing an introduction to the video teleconferencing system. The right column of pushbuttons 784 activates a "filmclip" for the corresponding subject. For instance, activation of pushbutton 790 will open another DECspind window on the display through which a "filmclip" demonstration will be played back to the user.

The help system thus described offers the user three levels of comprehensive textual, audio and visual system documentation. At the first level, the "talking keys" offer the user quick access to audio information about a function available for selection by the user. At the second level, the pop-up "information" window helps to narrow the user's help requirements to a specific topic. At the third level, the pop-up "sub-help" window offers the user textual and/or audio/visual documentation on a variety of subjects related to the selected second level topic.

Furthermore, the file storage structure for the help documentation adds a high degree of flexibility to the audio/visual documentation system of this invention. For instance, each "audio clip" of the "talking key" help function is stored in a separate key-specific file which is played back when the talking help function is activated. Thus, if the function of a key changes, only a single audio file needs to be updated. Furthermore, the audio help system can be easily internationalized by providing an "audio clip" file set corresponding to the desired foreign language. This also applied to the textual and "filmclip" documentation which is stored in separate subject-specific files. Thus, if a system function changes, only the text and/or "filmclip" files affected by the change need to be updated. Although this audio/visual documentation system has been described with reference to the video teleconferencing application of this invention, it will be apparent to those skilled in the art that such an audio and/or visual help system can be provided on a multi-media workstation or PC for virtually any type of application.

Figure 26A:
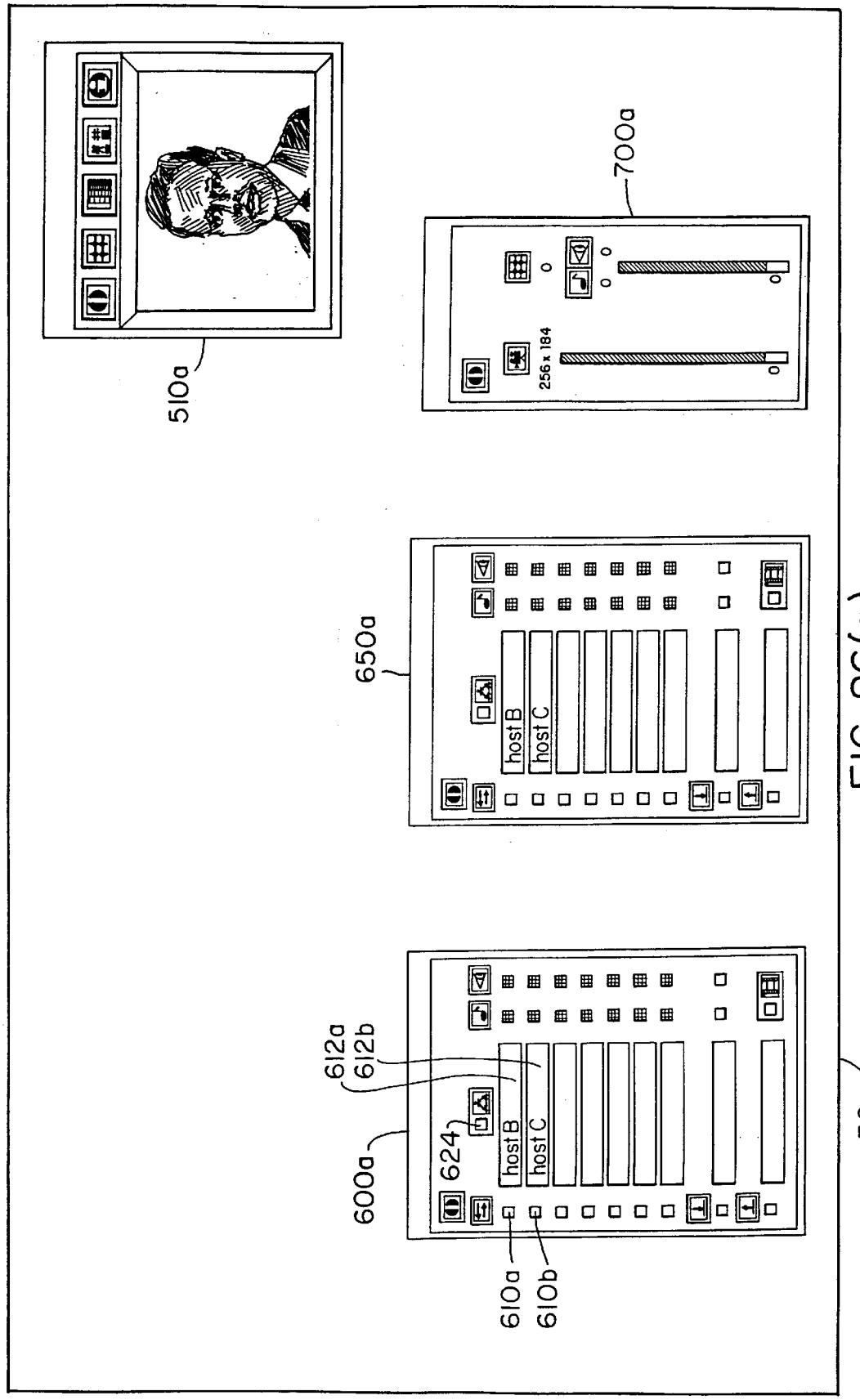

FIGS. 26(a)–26(k) show the display screens of three workstations, Workstation A (30a), Workstation B (30b), and Workstation C (30c) during the initiation of a typical three-way video teleconference using the Graphical User Interface of this invention. FIG. 26(a) shows a typical display 30a for Workstation A after the DECspin application has been invoked but before the initiation of a video teleconference. This display shows a DECspin session window 510a for monitoring the local video generated by Workstation A. The user of Workstation A has activated the "call list" window 600a, the "control" window 650a, and the "monitor" window 700a.

Figure 26B:
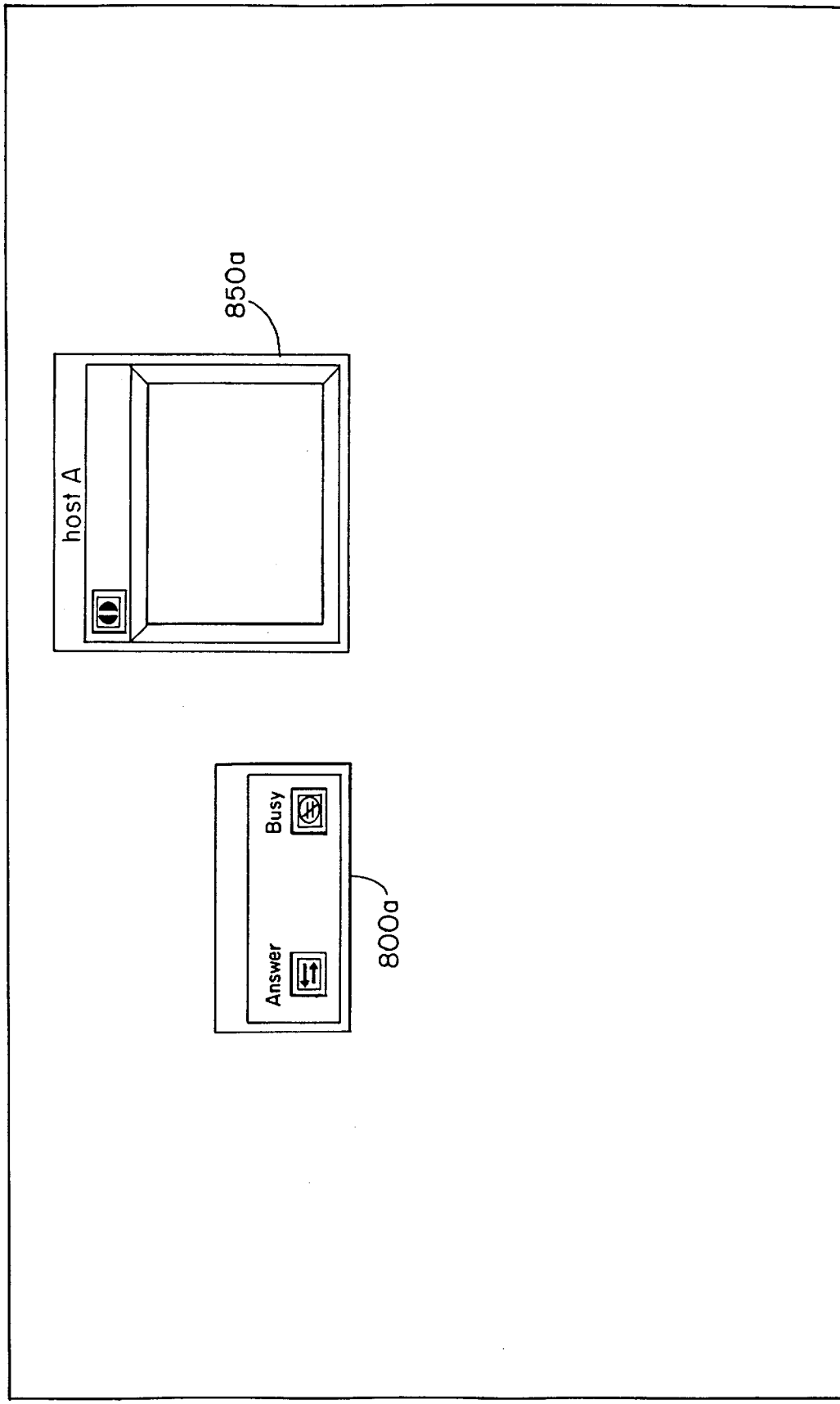

The user of Workstation A initiates a video teleconference call to Workstation B ("host B") by activating pushbutton 610a of the "call list" window. FIG. 26(b) shows the display 30b of Workstation B after Workstation A places the call. A "ring box" 800a and a blank DECspind session window 850a, identifying the calling party ("host A") appear on the Workstation B display. The user of Workstation B answers the video teleconference call by activating the answer pushbutton of "ring box" 800a.

Figure 26D:
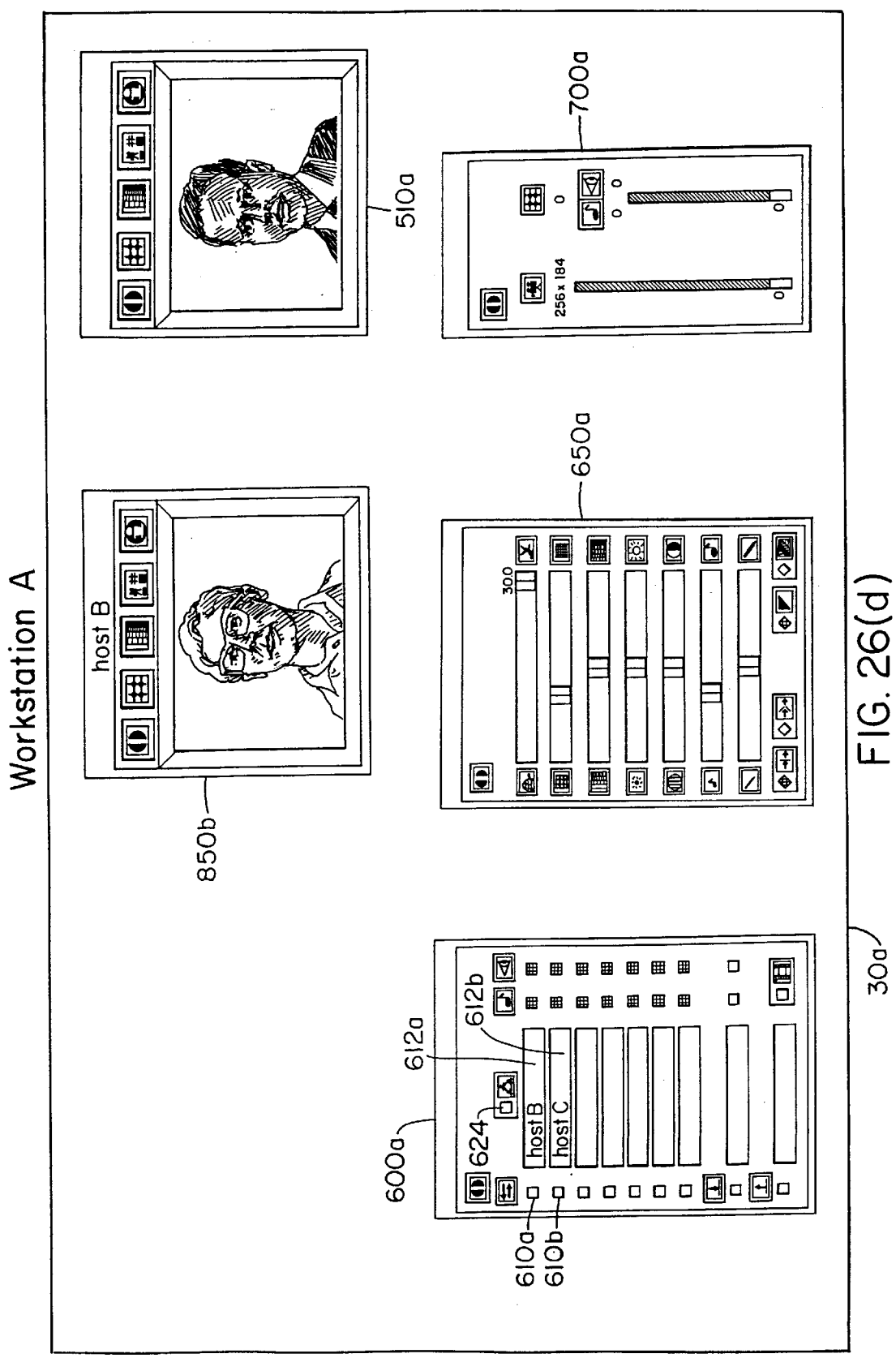

FIG. 26(c) shows the display 30b of Workstation B after the user answers the call from Workstation A. Here, the video (and audio) of the host A DECspind session window 850a has been activated. Further, a local DECspin session window 510b appears to allow the user of Workstation B to monitor the local video signal. Here also, the user of Workstation B has invoked the "control" window 650b from the DECspin session Window 510b. FIG. 26(d) shows the display of Workstation A after Workstation B has answered the video teleconference call. A host B DECspind window 850b provides return video from Workstation B to Workstation A.

The user of Workstation A initiates a video teleconference call to another user on Workstation C ("host C") by activating pushbutton 610b of the "call list" window 600a.

Figure 26E:
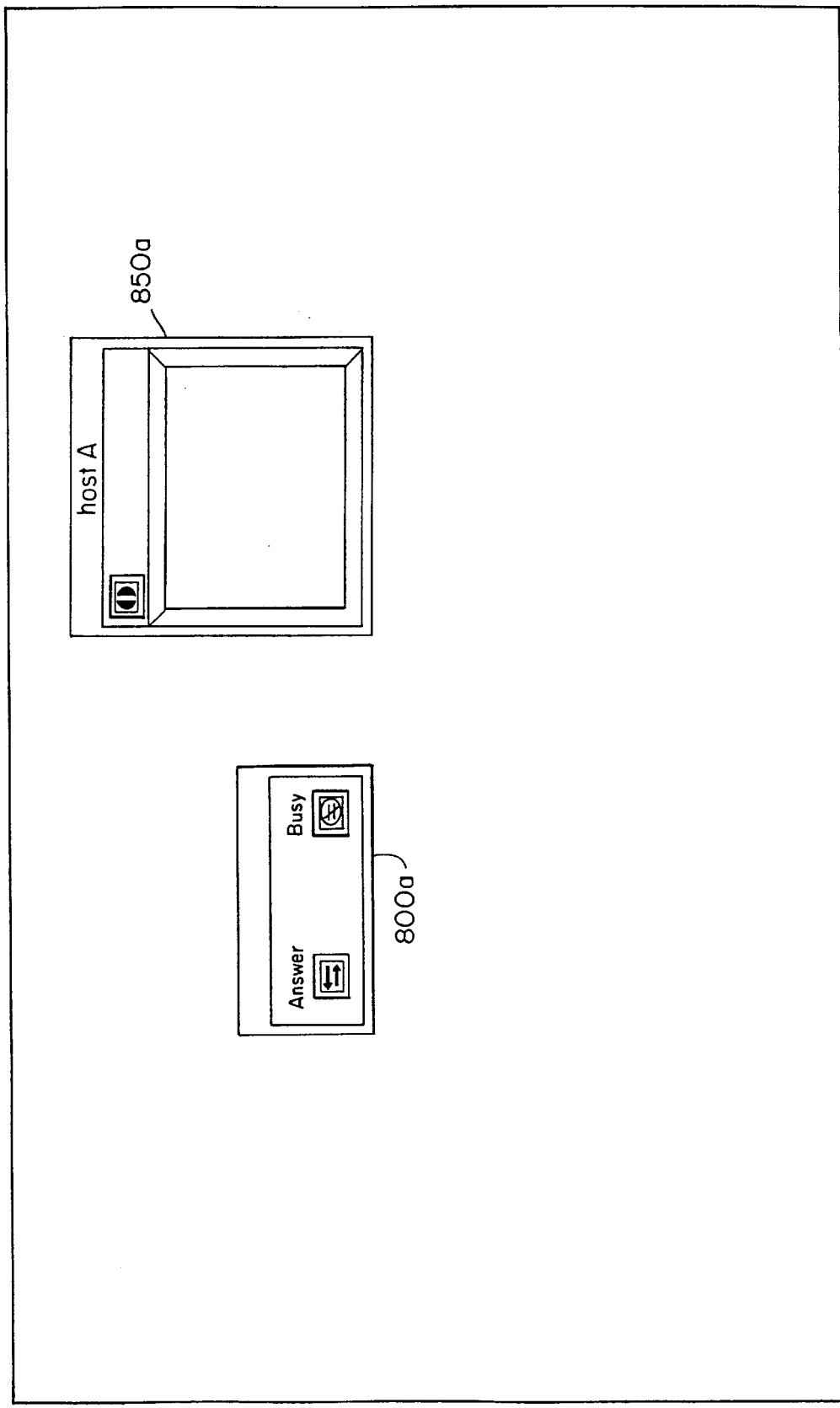
Figure 26F:
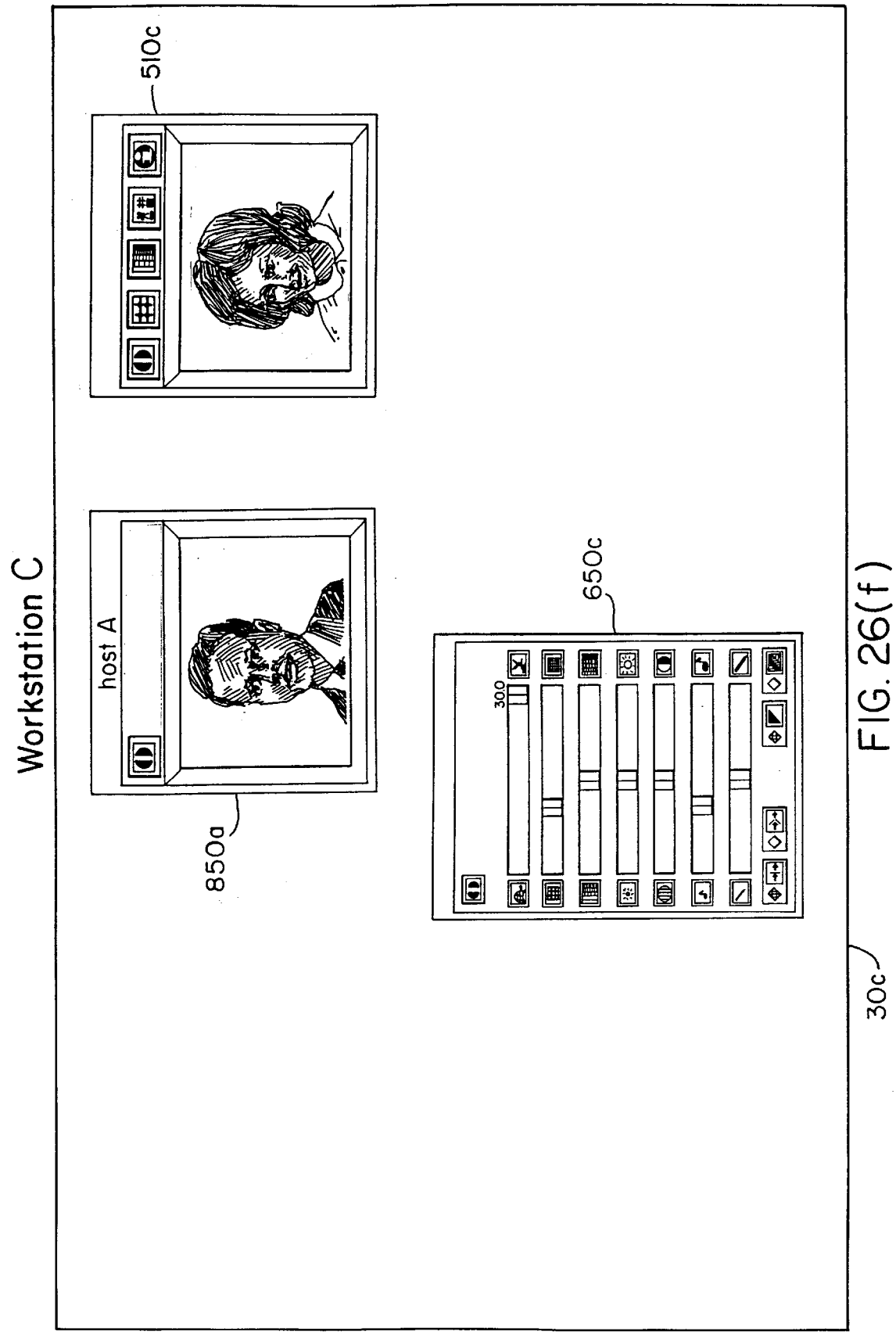
Figure 26G:
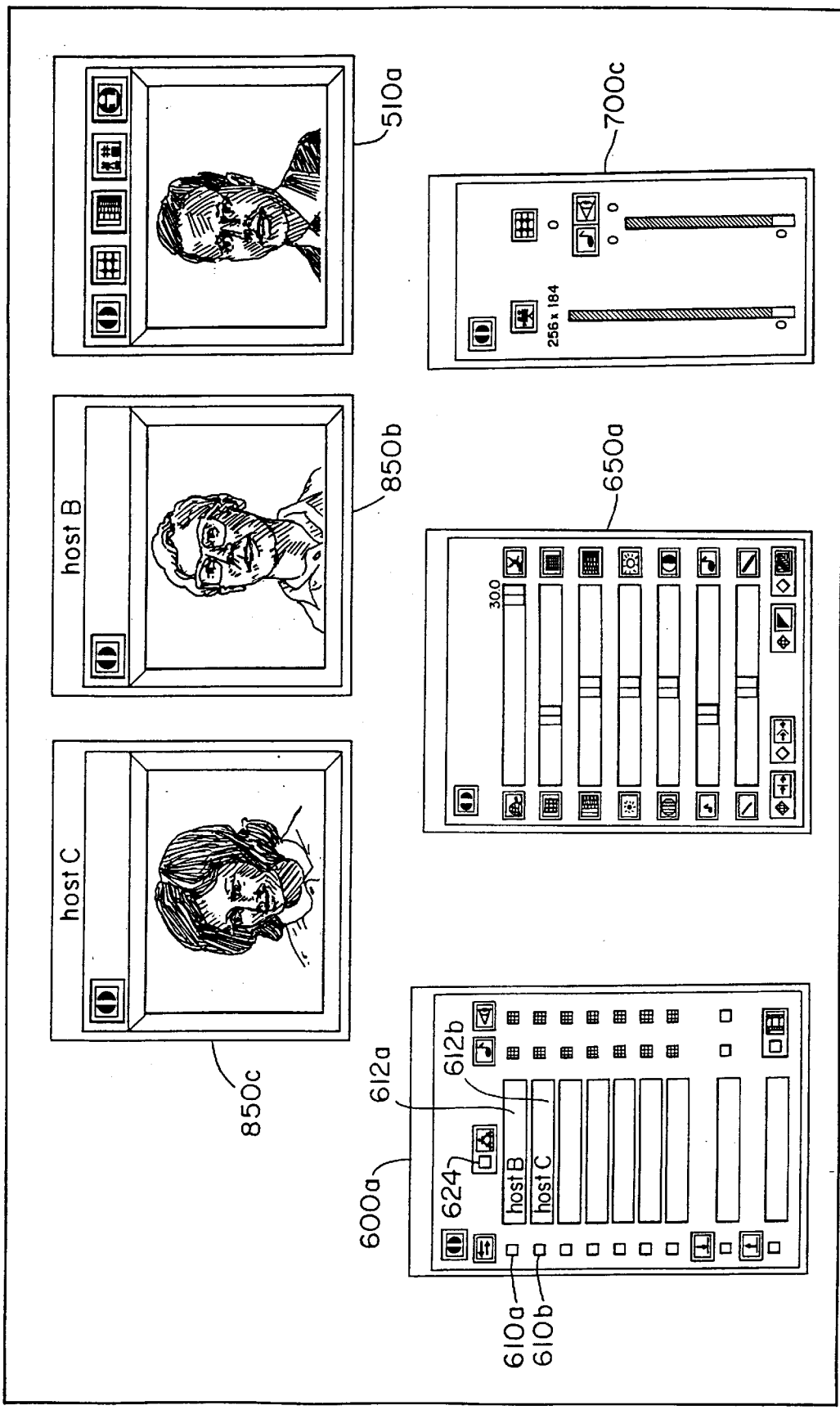
Figure 26H:
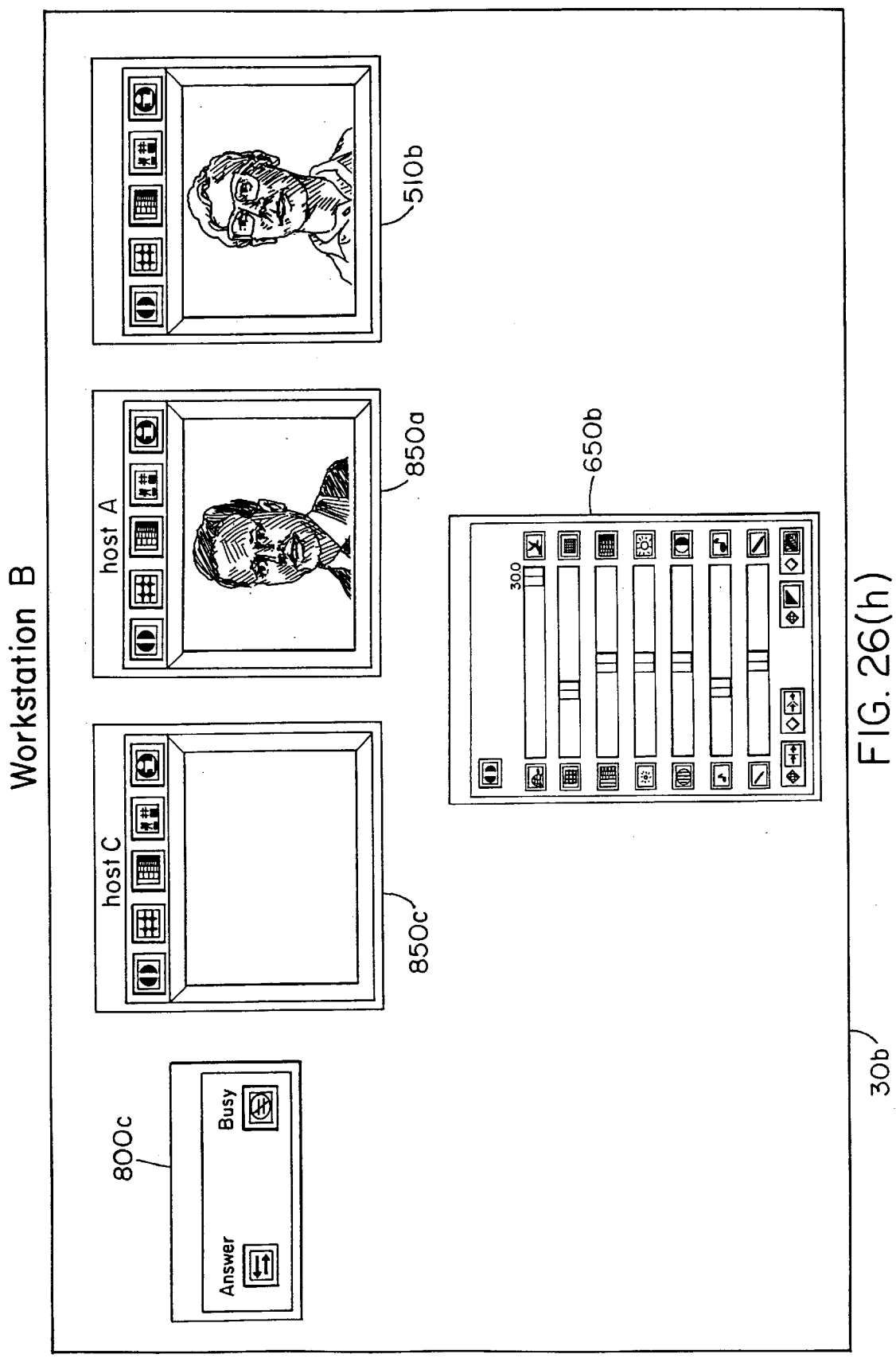
Figure 26J:
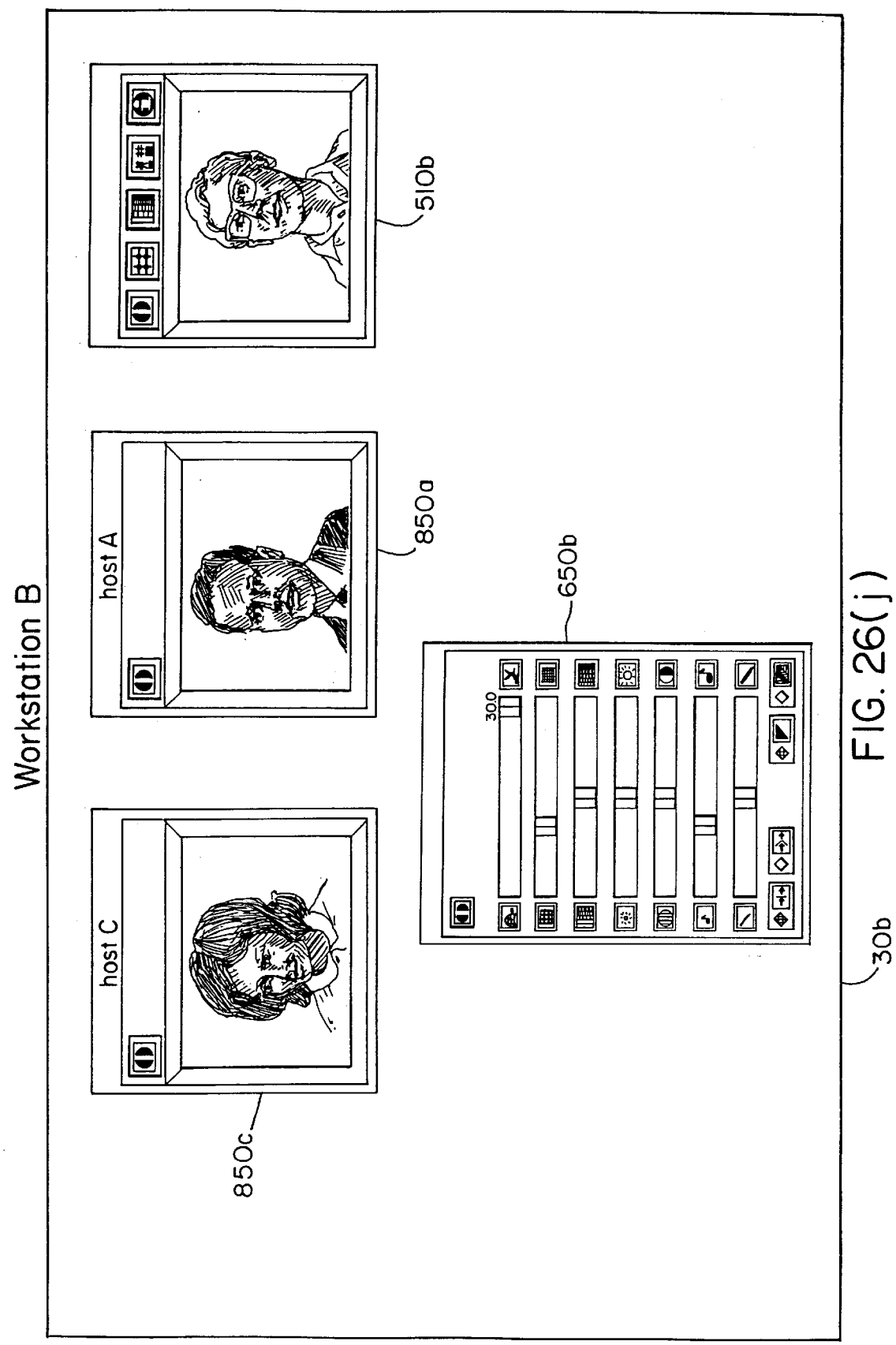

FIGS. 26(e) and 26(f) show the display 30c of Workstation C after Workstation A places the call, and after Workstation C answers the call, respectively. Here again, the user answering the call to Workstation C causes the invocation of a local DECspin session window 510c to monitor local video from Workstation C. FIG. 26(g) shows the display 30a of Workstation A after the user of Workstation C answers the call. A host C DECspind session widow 850c displays the return video from Workstation C to Workstation A.

At this point the user of Workstation A can join the users of Workstation B and Workstation C into a three-way conference by activating the "join" pushbutton 624 of the "call list" window 600*a*. Upon activation of the "join" pushbutton, Workstation B is caused to place a video teleconference call to Workstation C, and vice versa. FIGS. 26(*h*) and 26(*i*) show the display of Workstation B and Workstation C, respectively, after the call is placed, but before it is answered. A "ring box" and blank DECspind application session window from Workstation C (800*c* and 850*c*) appear on the display of Workstation B (FIG. 26(*h*)) and a "ring box" and blank DECspind application session window from Workstation B (800*b* and 850*b*) appear on the display of Workstation C (FIG. 26(*i*)).

FIGS. 26(*j*) and 26(*k*) show the display of Workstation B and Workstation C, respectively, after the user of each workstation has.answered their respective "ring box" of FIGS. 26(*a*) and 26(*i*). Thus, FIGS. 26(*g*), 26(*j*) and 26(*k*) show the resulting display of Workstations A, B, and C, respectively, when all are joined into a three-way video teleconference.

Equivalents

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. Video teleconferencing apparatus for a distributed data processing system having a plurality of computer workstations connected by a digital data network, the computer workstations comprising:
   a) source means for a local workstation to send audio and video data across the digital data network as digital data packets to a remote workstation;
   b) receiver means for the local workstation to receive audio and video data from across the digital data network as digital data packets sent from source means of the remote workstation;
      wherein the source means of the local workstation sends audio and video data to the receiver means of the remote workstation over one variable bandwidth digital data connection, and the source means of the remote workstation sends audio and video data to the receiver means of the local workstation over another variable bandwidth digital data connection.

2. A method for transmitting audio and video teleconferencing data between computers over a computer network, the method comprising:
   transmitting audio data and frames of video data to remote computers via the computer network;
   detecting acknowledgment signals from the remote computers indicating that the remote computers received the frames of video data; and
   transmitting new frames of video data to the remote computers in response to the receipt of the acknowledgement signals.

3. The method described in claim 2, further comprising precluding transmission of the new frames of video data to the remote computers in response to a system overload condition.

4. The method described in claim 3, further comprising sending a portion of the audio data corresponding in time to the precluded frame of video data to the remote computer to prevent loss of continuity of an audio signal reconstructed by the remote computer during the system overload condition.

5. The method described in claim 3, further comprising determining an existence of a system overload condition in response to an elapsed time between sending a frame of video data to the remote computer and receiving an acknowledgement signal for that frame of video data from the remote computer.

6. The method described in claim 3, further comprising:
   sending any audio data accumulated since the last video frame was sent to the remote computer upon receipt of the acknowledgement signal from the remote computer for the last video frame; and
   sending the most recently available frame of video data to the remote computer and dropping any other intervening frames of video data which became available during the overload condition.

7. The method described in claim 2, further comprising:
   sending to the remote computer any audio data accumulated since the last video frame was sent to the remote workstation, when another video frame becomes available if no overload condition exists; and
   sending the most recently available frame of video data from the local workstation to the remote workstation if no overload condition exists.

8. The method described in claim 2, further comprising attaching timing information to each frame of video data sent to the remote computer to indicate a point in the continuous audio data stream which corresponds in time to the frame of video data.

9. The method described in claim 8, further comprising displaying a received frame of video when the point in the audio stream corresponding to the timing information of the received video frame is audibly reproduced at the remote computer.

10. The method described in claim 9, further comprising:
   generating timing information by counting the amount of audio data received; and
   comparing the generated timing information with the timing information sent along with the most recently received video frame to determine when to display the most recently received frame of video data.

11. A method for maintaining an audio and video teleconference between computers over a computer network, the method comprising:
   generating audio data representative of an audio input to the computer;
   packetizing the audio data according to a protocol of the computer network and transmitting the packets to another computer over the network;
   generating frames of video data representative of a video input to the computer;
   packetizing the video data according to the protocol of the computer network and transmitting the packets to the other computer over the network; and
   transmitting timing information to the other computer that correlates the frames of video data to the audio data in time enabling the other computer to display the frames of video data when the corresponding portion of the audio data is reproduced.

12. The method described in claim 11, further comprising precluding transmission of the new frames of video data to the remote computer in response to a failure of the remote computer to acknowledge receipt of previously sent frames of video data.

13. The method described in claim 11, further comprising attaching the timing information to the frames of video data sent to the other computer.

14. The method described in claim 11, further comprising the other computer displaying a received frame of video when the point in the audio stream corresponding to the timing information of the received frame of video data is audibly reproduced.

15. The method described in claim 11, further comprising:

generating timing information by counting the amount of audio data received; and comparing the generated timing information with the timing information sent along with the most recently received video frame to determine when to display the most recently received frame of video data.

* * * * *